US009680782B2

(12) United States Patent
Barshow et al.

(10) Patent No.: US 9,680,782 B2
(45) Date of Patent: Jun. 13, 2017

(54) IDENTIFYING RELEVANT CONTENT IN EMAIL

(71) Applicant: Dropbox, Inc., San Francisco, CA (US)

(72) Inventors: David Barshow, Menlo Park, CA (US); Ringo Law, Dublin, CA (US); Kevin Ewe, San Jose, CA (US); Sean Beausoleil, Mountain View, CA (US); Andrew Long, San Jose, CA (US); Steven Kabbes, Mountain View, CA (US); Michael Roeder, Oakland, CA (US)

(73) Assignee: DROPBOX, INC., San Francisco, CA (US)

( * ) Notice: Subject to any disclaimer, the term of this patent is extended or adjusted under 35 U.S.C. 154(b) by 131 days.

(21) Appl. No.: 14/155,304

(22) Filed: Jan. 14, 2014

(65) Prior Publication Data

US 2015/0032829 A1    Jan. 29, 2015

Related U.S. Application Data

(60) Provisional application No. 61/859,739, filed on Jul. 29, 2013.

(51) Int. Cl.
*G06F 15/16* (2006.01)
*H04L 12/58* (2006.01)

(52) U.S. Cl.
CPC .................... *H04L 51/16* (2013.01)

(58) Field of Classification Search
CPC ....... H04L 51/16; H04L 12/586; H04L 12/58; G06Q 10/10; G06Q 10/107
See application file for complete search history.

(56) References Cited

U.S. PATENT DOCUMENTS 5,822,526 A    10/1998  Waskiewicz
7,197,470 B1 *  3/2007  Arnett .................... G06F 21/31
                                                   705/7.29

(Continued)

FOREIGN PATENT DOCUMENTS

CN     104823414 A     8/2015
WO      01/63875 A2    8/2001
WO    2014/081863 A1   5/2014

OTHER PUBLICATIONS

International Preliminary Report on Patent Ability, dated Jun. 4, 2015, for International Patent Application No. PCT/US2013/071066, 14 pages.

(Continued)

*Primary Examiner* — Anthony Mejia
(74) *Attorney, Agent, or Firm* — Chia-Hsin Chu; Page Ponsford; DLA Piper LLP US

(57) ABSTRACT

Message management services can include processing an email to identify relevant content from among all content in the email and converting the identified relevant content into a simple, easy-to-read format. For example, message management services can apply multiple parsing strategies to an email. Each strategy can attempt to parse the email to identify relevant content and to output results that include any identified relevant content and an associated confidence score. The results having the highest confidence score can be selected. The identified relevant content included in the selected results can be converted into a flat string with stylings and links for displaying relevant content of the email in a simple, easy-to-read format.

25 Claims, 22 Drawing Sheets

(56) References Cited

U.S. PATENT DOCUMENTS

| | | | |
|---|---|---|---|
| 7,693,940 | B2 | 4/2010 | Carmel et al. |
| 7,788,218 | B2 | 8/2010 | Gerritsen et al. |
| 8,185,482 | B2* | 5/2012 | Yang ................ G06N 5/02 |
| | | | 706/12 |
| 8,380,697 | B2* | 2/2013 | Benyamin ............ H04L 12/58 |
| | | | 707/710 |
| 8,775,520 | B1 | 7/2014 | Lewis et al. |
| 8,787,335 | B2 | 7/2014 | Smith et al. |
| 9,063,989 | B2 | 6/2015 | Buchheit |
| 9,317,592 | B1* | 4/2016 | Bowman ........ G06F 17/30705 |
| 9,420,437 | B2* | 8/2016 | Johnston ............. H04W 4/12 |
| 9,449,050 | B1* | 9/2016 | Molina ........... G06F 17/3053 |
| 2004/0128355 | A1* | 7/2004 | Chao ................ H04L 63/14 |
| | | | 709/206 |
| 2005/0015626 | A1* | 1/2005 | Chasin ............ H04L 63/0245 |
| | | | 726/4 |
| 2005/0181768 | A1 | 8/2005 | Roy |
| 2006/0155810 | A1 | 7/2006 | Butcher |
| 2006/0190830 | A1* | 8/2006 | Gerstl ............. H04L 51/066 |
| | | | 715/757 |
| 2007/0038707 | A1* | 2/2007 | Broder ............. G06Q 10/107 |
| | | | 709/206 |
| 2007/0078973 | A1* | 4/2007 | Kussmaul .......... G06Q 10/107 |
| | | | 709/224 |
| 2007/0124432 | A1* | 5/2007 | Holtzman ......... G06F 17/2745 |
| | | | 709/219 |
| 2008/0162651 | A1* | 7/2008 | Madnani ........... G06Q 10/107 |
| | | | 709/206 |
| 2008/0201668 | A1 | 8/2008 | Roy |
| 2008/0208980 | A1 | 8/2008 | Champan et al. |
| 2008/0256179 | A1 | 10/2008 | Gorty et al. |
| 2009/0287780 | A1* | 11/2009 | Gawor ............. G06Q 10/107 |
| | | | 709/206 |
| 2010/0070594 | A1 | 3/2010 | Yoshimura |
| 2010/0153106 | A1 | 6/2010 | Frazier et al. |
| 2010/0153493 | A1 | 6/2010 | Clarke |
| 2010/0174784 | A1 | 7/2010 | Levey et al. |
| 2010/0293242 | A1 | 11/2010 | Buchheit et al. |
| 2011/0178962 | A1* | 7/2011 | Sood .................. H04L 51/12 |
| | | | 706/11 |
| 2011/0202616 | A1 | 8/2011 | Kinoshita |
| 2011/0276905 | A1* | 11/2011 | Hamilton ............ G06Q 10/10 |
| | | | 715/758 |
| 2012/0124147 | A1* | 5/2012 | Hamlin ............... H04L 51/36 |
| | | | 709/206 |
| 2012/0131474 | A1* | 5/2012 | Panchadsaram ..... G06Q 10/107 |
| | | | 715/752 |
| 2012/0131659 | A1 | 5/2012 | Roy et al. |
| 2012/0185797 | A1* | 7/2012 | Thorsen ............ G06Q 10/00 |
| | | | 715/784 |
| 2013/0035123 | A1 | 2/2013 | Smith et al. |
| 2013/0097526 | A1* | 4/2013 | Stovicek ........... G06Q 10/107 |
| | | | 715/752 |
| 2013/0191732 | A1 | 7/2013 | Lazarevic et al. |
| 2014/0143358 | A1 | 5/2014 | Beausoleil et al. |
| 2014/0244775 | A1* | 8/2014 | Hull ................... H04L 51/26 |
| | | | 709/207 |
| 2014/0280235 | A1* | 9/2014 | Lacage ........... G06F 17/30722 |
| | | | 707/749 |

OTHER PUBLICATIONS

Non-Final Office Action, dated Aug. 10, 2015, for U.S. Appl. No. 14/084,142, filed Nov. 19, 2013, 10 pages.

International Search Report, dated Mar. 18, 2014, for International Patent Application No. PCT/US2013/71066, filed Nov. 20, 2013, 3 pages.

Written Opinion, dated Mar. 18, 2014, for International Patent Application No. PCT/US2013/71066, filed Nov. 20, 2013, 10 pages.

* cited by examiner

FIG. 3

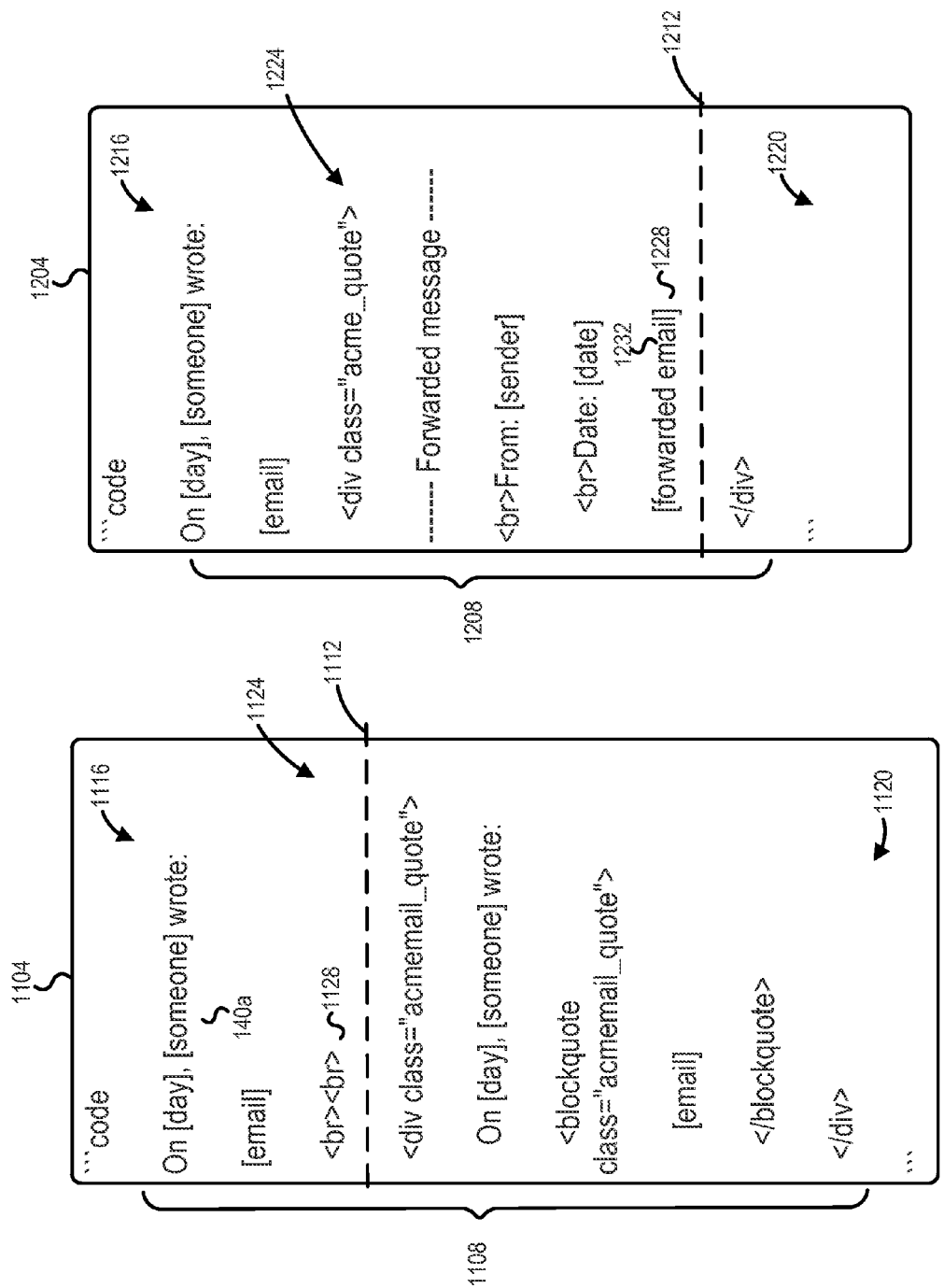

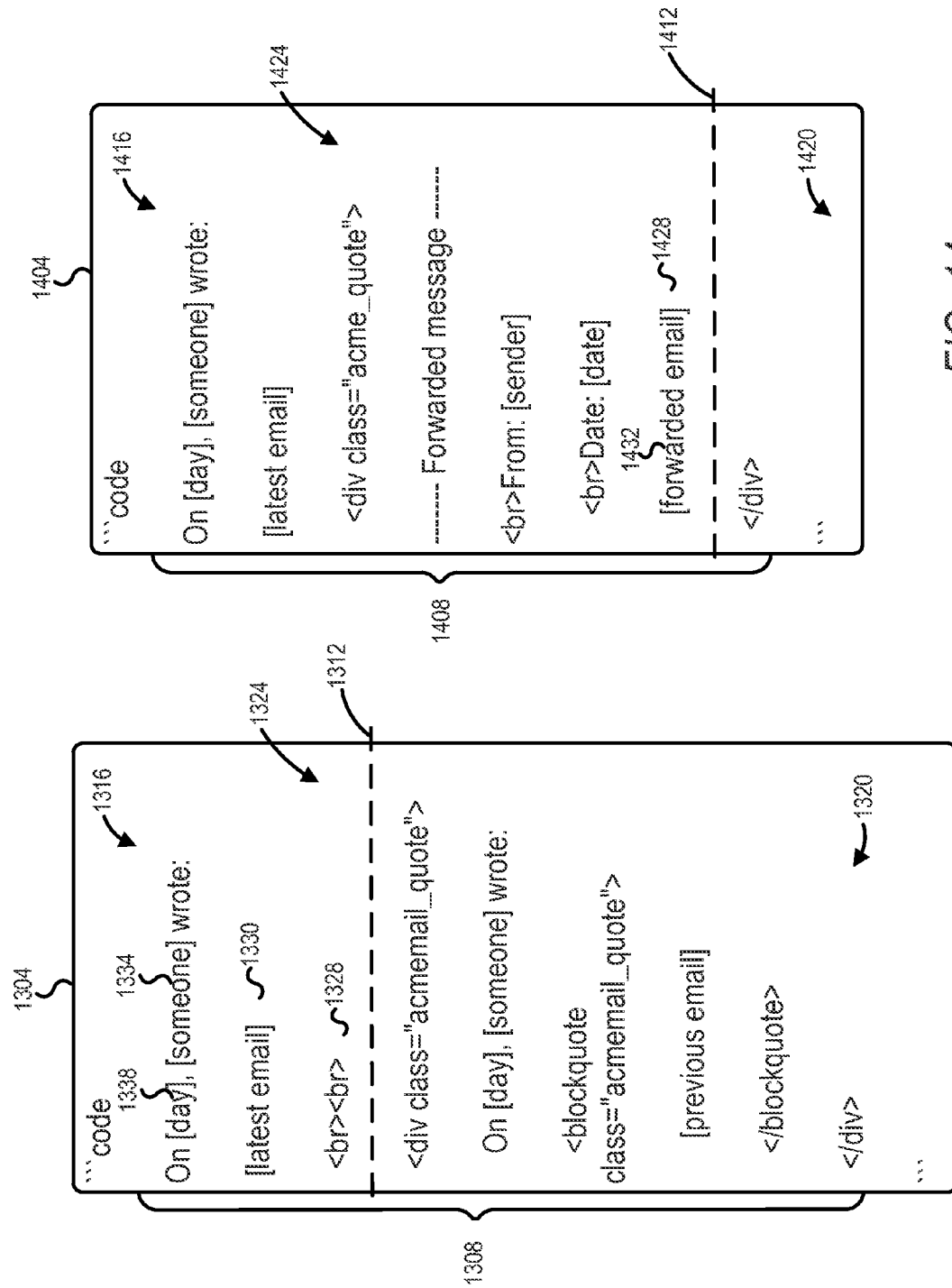

| Email Content Format | Native Message Format |
|---|---|
| <br/> | /n |
| <p>, </p>, <div>, </div>, <html>, </html>, <head>, </head> | "" |
| <b>, </b> | NativeBoldText |
| <i>, </i> | NativeItalicText |
| <u>, </u> | NativeUnderlineText |
| <a href="foo">text</a> | NativeLink with index referencing txt and data="foo" |

FIG. 21

```
{                    ╭2208
contribution: "plain text string", ╯                              ╭2208
    preview: (first 100 characters of contribution),
        fullBody: boolean indicating whether there is more to be fetched for the "full"
email,         ╭2216
        isHTML: boolean,                       ╭2212
        stylings: [
            {
                index: (index of styling start on returned string),
                length: (length that the styling should span),
                type: NativeStyleType,
                data: (extra data needed for the styling, like an href for a link),

IDENTIFYING RELEVANT CONTENT IN EMAIL

CROSS-REFERENCE TO RELATED APPLICATION

This application claims the benefit of U.S. Provisional Application No. 61/859,739, filed Jul. 29, 2013, entitled "Email Parser and Converter," the disclosure of which is incorporated by reference herein in its entirety.

BACKGROUND

This relates generally to email management services and in particular to processing an email to identify relevant content and/or to convert identified relevant content to a native format for display to a user.

An "email" as used herein can refer to an electronic message sent between two or more computing devices. A "reply" as used herein can refer to an email that replies to another email, a "forward" as used herein can refer to an email that forwards another email, and a "thread" as used herein can refer to a set of emails. A reply or forward can create or be added to a thread. For example, a reply to an original email can create a thread that includes the reply and the original email. Subsequent replies are added to the thread. A forward can create or be added to a thread in a similar manner. A reply or forward that is the latest email in a thread can include all previous emails in the thread. For example, the latest email in a thread can include contents of the previous emails in the thread, such as email addresses, date stamps, message identifiers, thread identifiers, client identifiers, signature blocks, repeated messages, and other contents that may not be of interest to a user. Such contents can cause a user to overlook, or waste time looking for, the actual message in the latest email or the actual messages in the previous emails.

SUMMARY

Some embodiments relate to message management services for email. Example message management services can include processing an email to identify relevant content from among all content in the email and converting the identified relevant content into a simple, easy to read format. For example, message management services can apply multiple parsing strategies to an email. Each strategy can attempt to parse the email to identify relevant content and to output results that include any identified relevant content and an associated confidence score, and multiple strategies can be applied concurrently. The results having the highest confidence score can be selected. The identified relevant content included in the selected results can be converted into a flat string with stylings and links for displaying relevant content of the email in a simple, easy to read format.

An email can include relevant content and irrelevant content. "Relevant content" as used herein can refer to content that can be of interest to a user. Such relevant content can be a graphic or text that conveys information that can be of interest to a user. Such relevant content can be located in a header or in a body of an email. For example, relevant header content can be a sender's name, a recipient's name, and a subject, which can be a short message from a sender. Also, for example, relevant body content can be a message from a sender. "Irrelevant content" as used herein can refer to content that may not be of interest to a user. Such irrelevant content can be a graphic or text that does not convey information of interest to a user. Such irrelevant content can be located in a header or in a body of an email. For example, irrelevant header content can be a sender's email address, a recipient's email address, a date stamp, and miscellaneous text added by an email client or provider, such as a message identifier, a thread identifier, and a client identifier. Also, for example, irrelevant body content can be a sender's name, email address, phone number, title, company name, legal disclaimer, and other text that can be included in a signature block.

A "conversation" as used herein can refer to relevant content of a thread, and a "latest contribution" as used herein can refer to relevant content of a latest email of a thread. For example, a reply ("first reply") to an original email can create a thread that includes the first reply and the original email. A reply ("second reply") to the first reply can be added to the thread. A conversation can include relevant content of any or all of the original email, the first email, and the second reply. A latest contribution can include relevant content of the second reply, which can be the latest email of the thread.

Certain embodiments of the present invention relate to methods executed on a server system in which multiple strategy modules are applied to identify relevant content in an email. Each module can output the identified relevant content and a confidence score. Based on this output, a strategy manager of the server system can select the identified relevant content that has a highest confidence score. This content can be provided to a client and/or used in displaying or otherwise presenting a conversation in which the email is included. For instance, relevant content can be converted to a native format supported by the client.

For example, the email can be a latest email in a thread and can include contents of one or more previous emails in the thread. The strategy modules can detect a pattern within the latest email that closely matches a message boundary pattern, which indicates the presence of a message boundary within the email. The new contribution of the email to the thread can be determined based at least in part on the message boundary. In some embodiments, tree structures can be used to identify relevant content in an email containing multiple message boundaries.

Certain embodiments of the present invention relate to server systems that can include a strategy manager server with multiple strategy modules that can be implemented, e.g., as program code executable by a processor of the server system. Each strategy module can be applied to an email to detect a pattern in the email that closely matches a message boundary pattern indicating a message boundary within the email, to identify relevant content in the email, and to determine a confidence score indicative of how closely the pattern detected in latest email matches the message boundary pattern. The strategy manager server can apply two or more of the strategy modules to the latest email and select relevant content based on the confidence scores, e.g., selecting the relevant content identified by the strategy module that has the highest confidence score.

The following detailed description together with the accompanying drawings will provide a better understanding of the nature and advantages of the present invention.

BRIEF DESCRIPTION OF THE DRAWINGS

FIG. 3 shows an example email and a corresponding conversation in accordance with embodiments of the present invention.

FIG. 11 shows a portion of an email format of a reply in a thread in accordance with embodiments of the present invention.

FIG. 12 shows a portion of an email format of a forward in a thread in accordance with an embodiment of the present invention.

FIG. 13 shows a portion of an email format of a latest reply in a thread in accordance with embodiments of the present invention.

FIG. 14 shows a portion of an email format of a latest forward in a thread in accordance with embodiments of the present invention.

FIG. 21 shows a table of example message-format-conversion mappings in accordance with embodiments of the present invention.

FIG. 22 shows a native message format in accordance with embodiments of the present invention.

DETAILED DESCRIPTION

Figure 1:
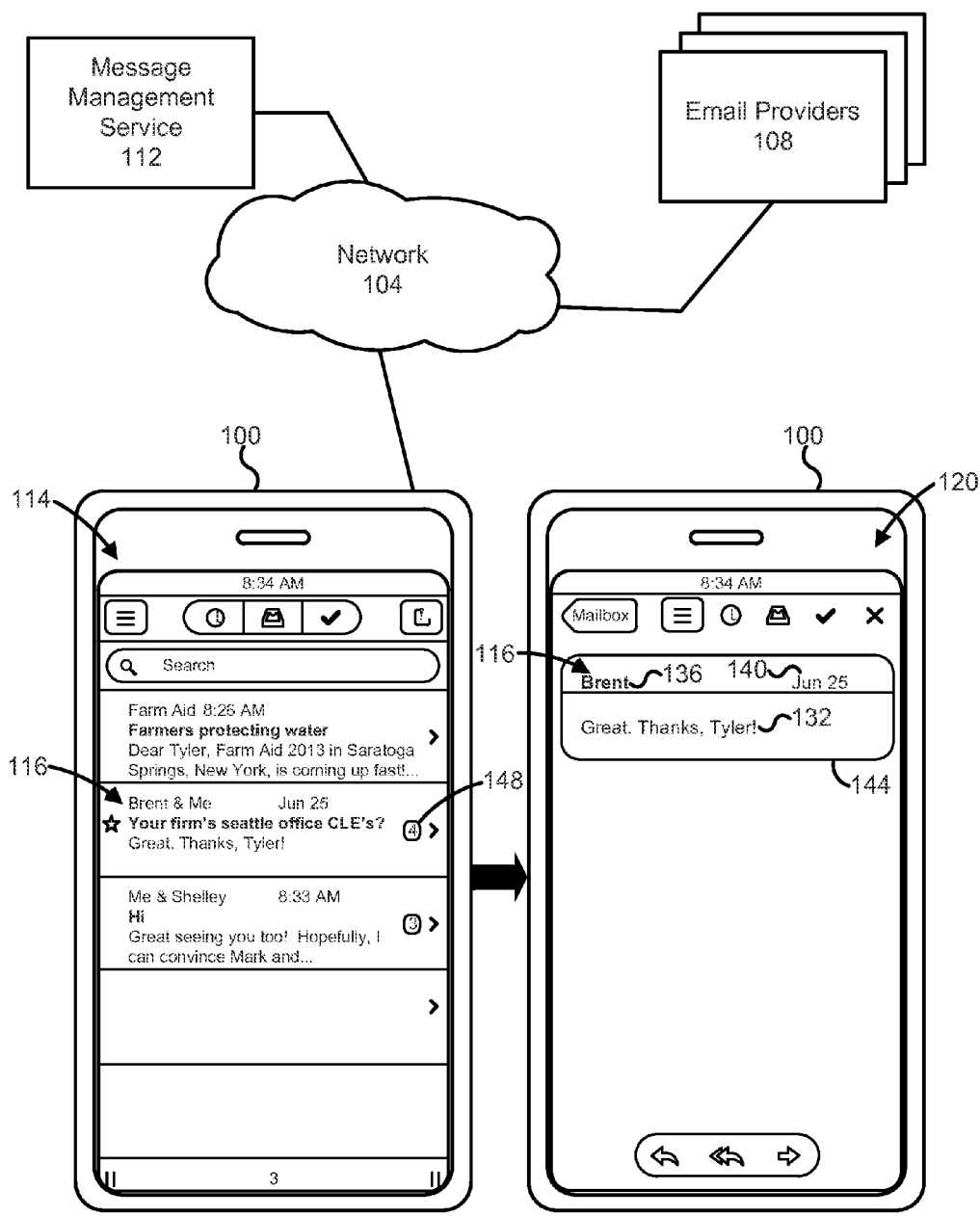
FIG. 1 shows a client provided in communication with a message provider and a message management service in accordance with embodiments of the present invention.

FIG. 1 shows client device 100 in communication, via network 104, with message providers 108 and message management service 112 in accordance with embodiments of the present invention.

In some embodiments, client device 100 can include a computer hardware, software, or a combination thereof that can enable a user to receive messages from message providers 108 and to interact with message management service 112. For example, client device 100 can be a mobile computing device executing an email app (e.g., the Mailbox app provided by Dropbox, Inc.) for receiving emails from message providers 108 and displaying received emails in an email inbox, such as email inbox 114.

Network 104 can be any appropriate network, including an intranet, the Internet, a cellular network, a mobile network, a local area network, a wide area network, a wireless data network, or any other such network or combination thereof. Communication over network 104 can be enabled by wired or wireless connections, and combinations thereof. Components utilized in any or all of client device 100, message providers 108, and message management service 112 can depend at least in part upon the type of network or combination of networks selected. Protocols and components for communicating via network 104 are well known and are not discussed herein in detail.

Message providers 108 can refer generally to entities that provide message services and/or that send out messages of any type. In some embodiments, message providers 108 can be email service providers that can send emails to client device 100. Examples of such message providers can include Gmail, AOL Mail, Yahoo! Mail, and other email providers. In other embodiments, message providers 108 can include text message services, instant message services, social network services, and/or microblogging services. Examples of such message providers include SMSCs (Short Message Service Centers); MMSCs (Multimedia Message Service Centers); instant message services; social network services; and microblogging services.

Message management service 112 can be hosted on servers maintained by a service provider and accessed via network 104. Message management service 112 can communicate with client device 100 and/or message providers 108 to allow a user to send, receive, store, organize, and search messages, as well as to apply management services to received messages.

An example of such management services can be a message service that can involve identifying relevant content in an email and converting the identified relevant content into a native format for display to a user via client device 100. For example, message management service 112 can apply such message service to latest email 116, which is shown as being located in email inbox 114. In this example, message management service 112 can apply multiple strategies to latest email 116. Each strategy can attempt to identify relevant content in latest email 116 and output results included any identified relevant content and associated confidence sore. The results having the highest confidence score can be selected, and the relevant content included in the selected results can be converted into a native format, as shown in message window 120. In some embodiments, the identified relevant content can be presented in text box 144 and can include message 132, name of sender 136, and receipt date 140 of email 116. The confidence score can correspond to the accuracy of the identified relevant content.

Figure 2:
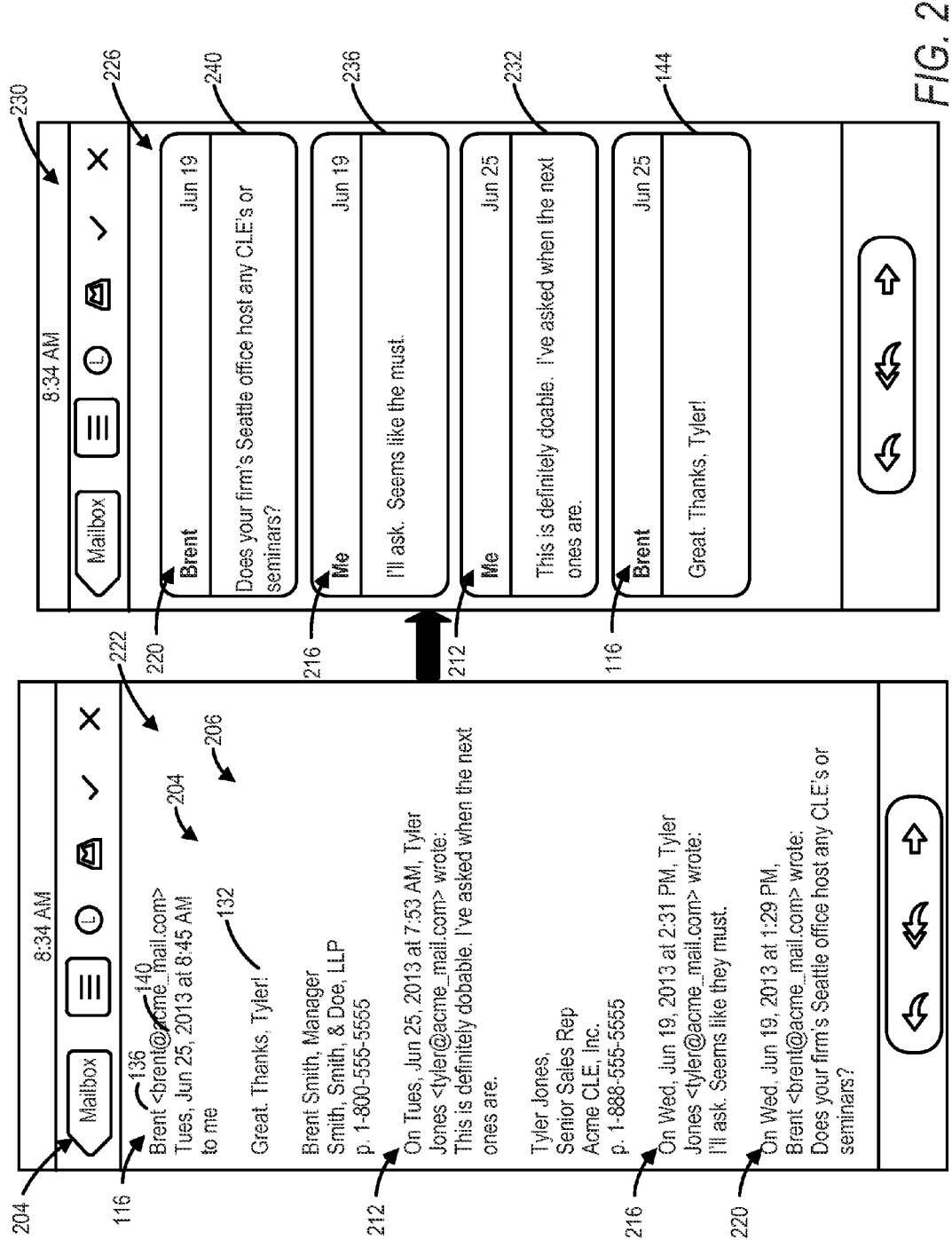
FIG. 2 shows an example email and a corresponding conversation in accordance with embodiments of the present invention.

As indicated by message counter 148, latest email 116 can be the latest email in a thread of four emails. In some embodiments, if no message management services are applied to latest email 116, rather than presenting latest email 116 as shown in message window 120, client device 100 can display latest email 116 in a format (e.g., HTML, plain text, etc.) used by email provider 108. This can result in latest email 116 being presented in a format that obfuscates its relevant content 132, 136, 140. For example, message window 204 of FIG. 2 shows latest email 116 presented according to a common format used by email providers in accordance with some embodiments. In addition to displaying relevant content 132, 136, 140 of latest email 116, message window 204 displays reply text 206 of latest email 116 that includes relevant and irrelevant content of previous emails 212, 216, 220 of thread 222. As illustrated, reply text 206 of latest email 116 can bury relevant content and cause a user to waste time looking for relevant content 132, 136, 140 of latest email 116. In some embodiments, a user can switch between window 204 and window 230. For example, when viewing window 204, if a user prefers to see only relevant content, the user can switch to window 230. However, if user is view relevant content in window 230 but wants to see more content, the user can switch to window 204.

Additionally, a user can waste even more time looking for relevant content of previous emails 212, 216, 220 in reply text 206. For example, a user may want to review such relevant content to obtain context for latest email 116. In some embodiments, in addition to identifying and/or converting to a native format relevant content of latest email 116, message management service 112 can identify and/or convert to a native format relevant content of previous emails 212, 216, 220. Together, relevant content of latest email 116 and relevant content of previous emails 212, 216, 220 can form conversation 226 of thread 222, as illustrated in message window 230. Conversation 226 can be arranged into chat boxes 144, 232, 236, 240, respectively. Since latest email 116 can be the fourth and latest email in thread 222, its relevant content can be presented in chat box 144, which can be the latest chat box of conversation 226. Latest email 116 can be a reply to previous email 212. Thus, relevant content of previous email 212 can be presented in chat box 232, adjacent chat box 144. A user can quickly glance at chat box 232 to quickly review relevant content of previous email 212 before or after review relevant content of latest email 116 in chat box 144. This can give a user context for latest email 116. Similarly, relevant content of previous email 216 can be presented in chat box 236, and relevant content of previous email 220 can be presented in chat box 240. Previous email 220 can be the first email in thread 222, and its relevant content can be displayed in the first chat box 240 of conversation 226. Presenting conversation 226 in such a chat-like organization can enable a user to quickly review relevant content of some or all emails 116, 212, 216, 220 of thread 222.

Relevant content of a latest email of a thread is sometimes referred to herein as a "latest contribution" to a conversation. Thus, relevant content 132, 136, 140 of latest email 116 is sometimes referred to as latest contribution to conversation 226.

FIG. 3 shows latest email 116 and corresponding conversation 226 of FIG. 2 along with reference numbers indicating which content can be relevant and which can be irrelevant in accordance with embodiments of the present invention. Latest email 116 is shown in message window 300, and corresponding conversation 226 is shown in message window 302. As mentioned above, message management service 112 can apply multiple strategies to latest email 116 to identify relevant content in latest email 116. Examples of such relevant content are described in more detail with reference to FIG. 3.

As noted above, latest email 116 can include contents of previous emails 212, 216, 220 of thread 222. In the illustrated example, contents of previous emails 212, 216, 220 can be included in reply text 206 of latest email 116. Latest email 116 can include header content 304*a* and body content 308*a*. Header content 304*a* can include sender's name 136*a*, sender's email address 316*a*, timestamp 320*a*, and recipient's name 324*a*. Timestamp 320*a* can include receipt date 140*a* (i.e., June 25). Receipt date 140*a* can also include time of receipt (i.e., '8:45 AM'). Body content 308*a* can include signature block 328*a* and message 132*a*. Body content 308*a* can also include reply text 206, which can include header and body content 304*b-d* and 308*b-d* of previous emails 212, 216, 220, respectively.

Some header content 304*a-d* can be considered relevant; other header content 304*a-d* can be considered irrelevant. Similarly, some body content 308*a-d* can be considered relevant, while other body content 308*a-d* can be considered irrelevant. For example, relevant header content 304*a-d* can include sender's name 136*a-d* and receipt date 140*a-d*, and relevant body content 264*a-d* can include message 132*a-d*. Irrelevant header content 304*a-d*, for example, can include email address 316*a-d* and timestamp 320*a-d*, and irrelevant body content 308*a-d* can include signature block 328*a-b*.

Irrelevant content can sometimes bury relevant content. This can cause a user to waste time looking for relevant content, and, in some cases, this can cause a user to overlook relevant content altogether. For example, latest email 116 can include its own relevant content and irrelevant content and, because it is the latest email in thread 222, it can also include relevant and irrelevant content of previous emails 212, 216, 220. As such, a user can waste time reviewing all of this relevant and irrelevant content to identify relevant content of latest email 116. The user can waste even more time reviewing reply text 206 to identify relevant content of some or all of previous emails 212, 216, 220.

As mentioned above, in some embodiments, message management service 112 can identify relevant content in an email and convert identified relevant content to a native format for presentation to a user. This can save a user from having to waste time looking for relevant content, and it can help prevent a user from overlooking relevant content.

For example, message management services can apply multiple parsing strategies to latest email 116, where each strategy can attempt to parse latest email 116 to identify relevant content and to output results that include any identified relevant. For example, identified relevant content can include message 132*a*, sender's name 136*a*, and receipt date 140*a*. Message management service 112 can convert such identified relevant content into a native format with custom styling to be presented to a user, as shown in chat box 144 of message window 302.

Further, for example, one or more of the strategies can be configured to parse reply text 206 of latest email 116 to identify relevant content in some or all of previous emails 212, 216, 220 of thread 222. For example, one or more strategies can be capable of identifying message 132*b*, sender's name 136*b*, and receipt date 140*b* as being relevant content of previous email 212, and message management service 112 can convert such identified relevant content into a native format with custom styling to be presented to a user, as shown in chat box 232 of message window 302. Also, for example, one or more strategies can be capable of identifying message 132*c*, sender's name 136*c*, and receipt date 140*c* as being relevant content of previous email 216, and message management service 112 can convert such identified relevant content into a native format with custom styling to be presented to a user, as shown in chat box 236 of message window 302. Further, for example, one or more strategies can be capable of identifying message 132*d*, sender's name 136*d*, and receipt date 140*d* as being relevant content of previous email 220, and message management service 112 can convert such identified relevant content into a native format with custom styling to be presented to a user, as shown in chat box 240 of message window 302. Relevant content of emails 116, 212, 216, 220 can combined into conversation 226, which can present relevant content of thread 222 in a chat-like organization that make it easy for a user to quickly review.

For example, chat boxes 144, 232, 236, and 240 of conversation 226 can be rendered in a single view and in a chat-like organization by an email app of client device 100. Such single-view rendering can enhance the speed at which a user can review relevant content of some or all emails in a thread. Additionally, such single-view rendering can be superior to traditional HTML web-views, such as shown in window 300. These traditional HTML web-views, because of slowness and formatting difficulties, can result in an email app having to render all contents of a thread in a single text box (rather than separate chat boxes), or render each email in a separate window. The former can result in a user wasting time trying to identify relevant content among all text presented in the single text box, and the later can result in a user wasting time waiting for windows to load and toggling between windows when trying to glean context for individual emails of the thread.

Figure 4:
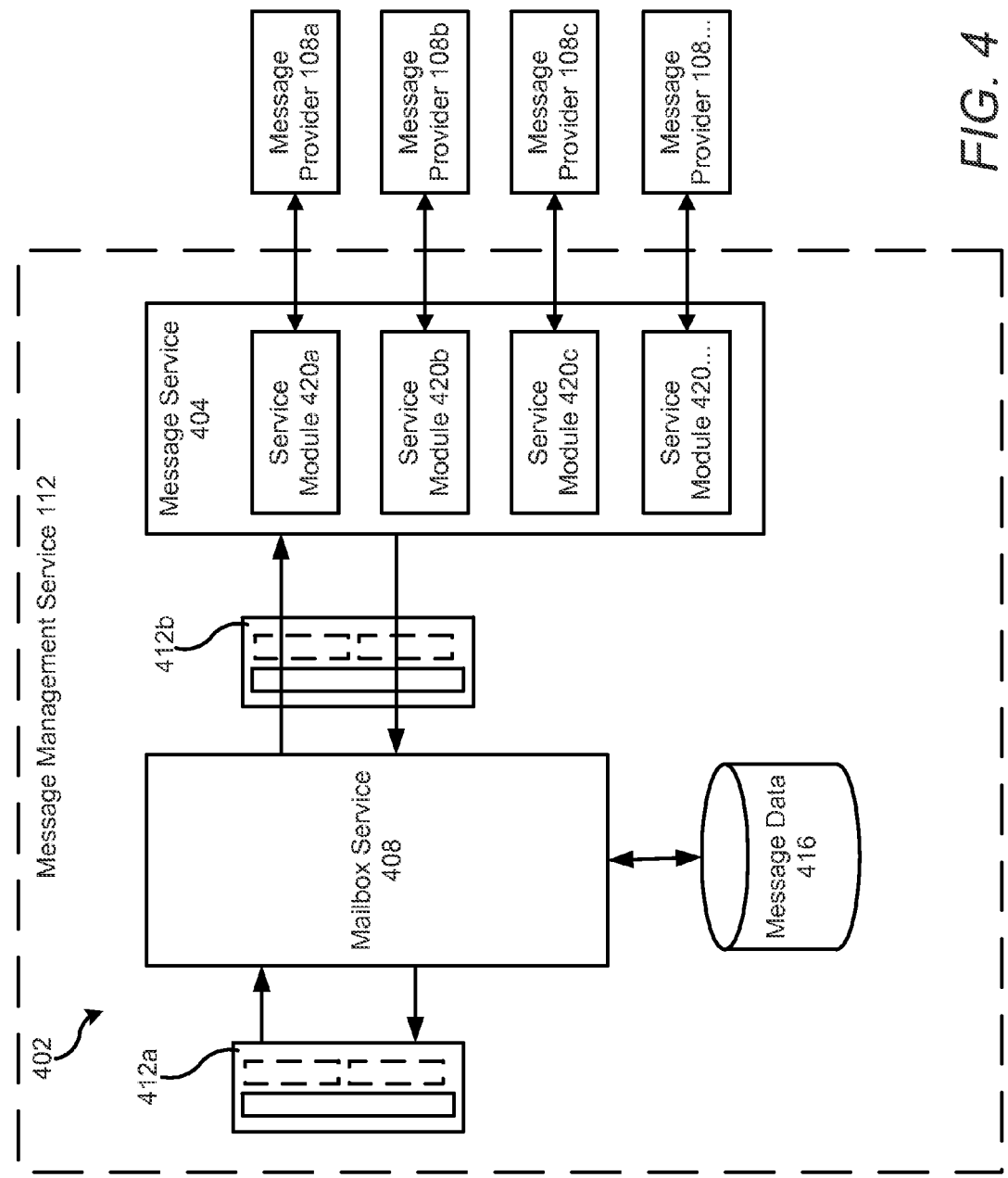
FIG. 4 shows a functional block diagram of components of message management service of FIG. 1 in accordance with embodiments of the present invention.

FIG. 4 shows a functional block diagram of components of message management service 112 of FIG. 1 in accordance with embodiments of the present invention. Message management service 112, in some embodiments, can act as an intermediary between service providers 108 and client device 100. In some embodiments, message management service 112 can function as a proxy for client device 100. In these embodiments, message management service 112 can receive incoming emails or other messages from message providers 108, and route such incoming emails or other messages to client device 100. Similarly, message management service 112 can receive outgoing emails or other messages from client device 100, and route such outgoing emails or other messages to message providers 108.

In some embodiments, message management service 112 can include backend server infrastructure 402 having message service layer 404, mailbox service layer 408, transfer layers 412*a*-*b*, and message data 416.

Backend server infrastructure 402 can be implemented on a managed distributed computing infrastructure, a multi-tenant computing infrastructure, a computing cluster, or any suitable infrastructure. The components can include various resources that act as or provide server, load balancing, queuing, caching, database, storage, or other suitable components. Backend server infrastructure 402 can be implemented to support a client app of client device 100. For example, backend infrastructure 402 can serve as an intermediary layer between client apps and service providers that coordinates features of the client apps. In some embodiments, backend server infrastructure 402 can include various design features that enable advanced features on a client app of client device 100 that are not natively provided by message providers 108.

Embodiments of message service layer 404 can function to interface with message providers 108. For example, message service layer 404 can be a server in a distributed computing infrastructure that manages message communication to and from message providers 108. In some embodiments, message service layer 404 can be a collection of servers and services that collectively operate to fulfill tasks that enable interfacing and coordinating with message providers 108. As each of message providers 108 can have a custom implementation, message service layer 404 can include multiple service modules or components 420, each specifically configured to interface with an individual one of message providers 108. For example, a particular one of service modules 420 can be specifically configured for a corresponding particular one of message providers 108, and can be configured with rules and/or instructions that account for message format issues and specialized features or capabilities; interpret message updates; and/or perform any suitable processing that can be specific to a particular one of message providers 108. For example, individual service modules 420 can be specifically configured to select an appropriate strategy that accounts for formatting in emails from corresponding individual message providers 108 so as to identify relevant content in emails sent from the corresponding individual message providers 108. In the illustrated example, service module 420*a* can be specifically configured for message provider 108*a*, service module 420*b* can be specifically configured for message provider 108*b*, service module 420*c* can be specifically configured for message provider 108*c*, and so on.

In some embodiments, to facilitate receiving emails from message providers 108, embodiments of message service layer 404 can use an IMAP (Internet Message Access Protocol) connection. Such IMAP connections can be made per account. A benefit of message service layer 404 establishing an IMAP connection is that any number of client apps can interact with messages. For example, a user can have multiple instances of a client app open, and each instance can share a signal IMAP connection, rather than each maintaining a separate IMAP connection. In some embodiments, to facilitate sending emails, message service layer 404 can use connections, such as an SMTP (Simple Mail Transfer Protocol) connection or any suitable outbound message protocol connection. Message service layer 404 can additionally or alternatively use connections such as POP MAPI/Exchange, Service APIs and/or any suitable connection. As another example, in some embodiments, using any connection made available by message service layer 404, message management service 112 can send outgoing messages to message providers 108 even when replying to a message received through a particular connection.

Embodiments of message service layer 404 can include logic to translate account or message updates, delivered from client device 100, into appropriate actions to execute on message providers 108. Account or message updates can include, for example, adding new folders, sorting messages into folders, starting a message, flagging a folder, marking a message as read/unread, and/or any suitable update between client device 100 and message providers 108. Message service layer 404 can additionally include logic to translate message updates from client device 100 into instructions compatible with message providers 108. Actions such as "archive all", "empty trash", "mark as unread", and/or any suitable message update action can include logic that guides the processing and communication of message updates directed at message providers 108.

Embodiments of mailbox service layer 408 can be communicatively coupled to an email app and possibly other apps of client device 100 via transfer layer 412a, and mailbox service layer 408 can be communicatively coupled to message providers 108 via transfer layer 412b and message service layer 404. In some embodiments, mailbox service layer 408 can enable some functionality of an email app and other apps of client device 100. An example benefit of mailbox service layer 408 can be its ability to support more responsive client app functions on client device 100.

Mailbox service layer 408 can cause some or all of the above-mentioned example actions to be performed on messages saved in message data 416. For example, mailbox service layer 408 can include logic to execute account or message updates, delivered from client device 100, on messages saved in message data 416. As mentioned above, account or message updates can include, for example, adding new folders, sorting messages into folders, deleting messages, starring messages, flagging a folder, marking a message as read/unread, and/or any suitable update from client device 100.

Mailbox service layer 408, or alternatively message service layer 404, can manage the state and windowing of multiple message streams. Message streams, in some embodiments, describe different collections of messages. Client apps of client device 100 can be designed to provide frequent access to certain message streams. An email inbox folder, for example, can be one message stream, where other message streams can include archives, message folders, labels, special folders (e.g., starred messages or deferred messages), and/or any suitable collection of messages. Maintaining the message streams in the backend infrastructure can avoid delays caused by on-demand access of an outside service provider when switching between message streams.

Stream or message records can be created and/or modified to appropriately direct message sorting and organization. For example, mailbox service layer 408 can additionally organize a message according to sorting history. In this way, moving a message to another stream places that message at the top of the stream when presented to a user of a client app of client device 100. This sorting organization can be an overriding sorting parameter on top of chronological organization. When receiving updates from a client app of client device 100, mailbox service layer 408 can additionally translate the update into a message provider update. For example, if an email is moved to the top of the inbox, mailbox service 408 can create a "tell message provider to move email to top of inbox" instruction to deliver to the appropriate message providers 108.

Mailbox service layer 408, in some embodiments, can additionally enable messages to be conditionally acted upon when a condition is satisfied. In a first variation, a user can place messages in a deferred message list with an assigned reminder condition. The reminder condition can be a time condition (e.g., "remind me in 24 hours", "remind me on June 22", etc.), or a condition based on geo-location of the user, geo-location of other users, geo-location of users relative to the device user, response by another recipient of the message, response to another message, device access (e.g., next time on desktop computer), a combination of Boolean logic for multiple conditions, programmatic logic (e.g., accessed through an API), and/or any suitable conditions. Once a condition or conditions are satisfied, mailbox service layer 408 can take the appropriate action. The action or response, in some embodiments, can include moving the message or thread or relevant content into the inbox. This can involve sending data to a client app of client device 100. The action can alternatively include any suitable action such as moving to another folder, sending a pre-composed response, archiving a message, deleting a message, sharing a message on a social network, sending an alert, or any suitable action.

As noted above, a "thread" as used herein can refer to a set of emails. In some embodiments, a set of emails included in a thread can be any set of related messages such as: messages replying to another message; messages forwarding another message; messages with shared subjects, bodies, senders, recipients, dates, and/or times; messages quoting a portion of another message; and/or any other grouping of messages. In some embodiments, message service layer 404 and/or mailbox service layer 408 and/or components thereof can use a thread ID provided by one of message providers 108 or alternatively an inbox scanning process to add emails to a thread.

Figure 5:
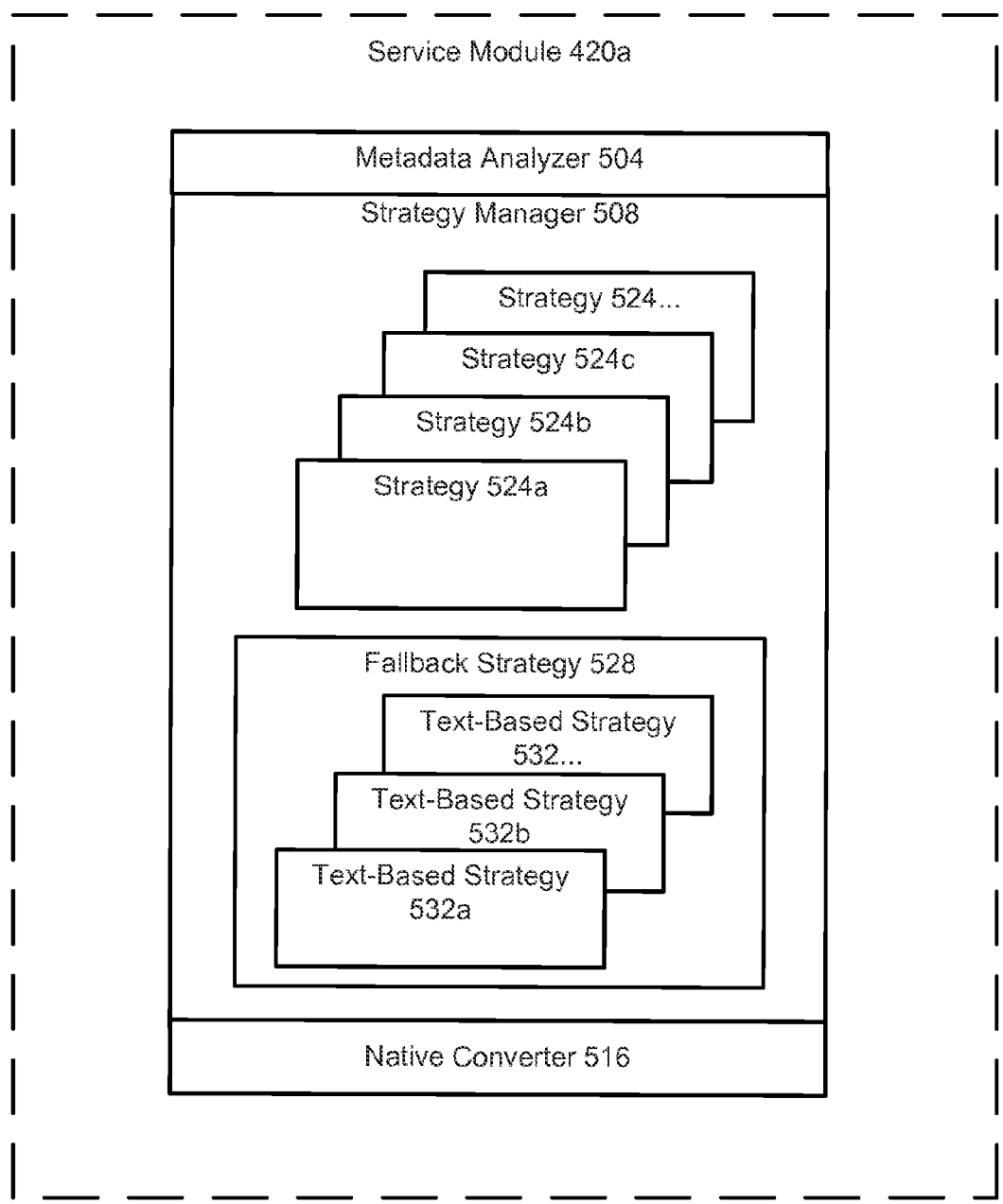
FIG. 5 shows a functional block diagram of components of the service module of the message management service of FIGS. 1 and 4 in accordance with embodiments of the present invention.

FIG. 5 shows a functional block diagram of components of an individual one of service modules 420 of message management service 112 of FIGS. 1 and 4, in accordance with some embodiments of the present invention. For example, FIG. 5 shows a function block diagram of components of service module 420a of message management service 112. It should be appreciated that other service modules 420, such as 420b-c, can have similar components and functionality. Service module 420a can select a strategy that can be used to identify relevant content in an email, and service module 420a can convert identified relevant content into a native format to be displayed to a user by a client app of client device 100.

Service module 420a can include metadata analyzer 504, strategy manager 508, and native converter 516. In some embodiments, metadata analyzer 504 analyzes metadata to make inferences about emails received at message service layer 404. Metadata analyzer 504 can share such inferences with strategy manager 508, which can use the inferences to inform its strategy-selection decisions. In some embodiments, service module 420a, metadata analyzer 504, strategy manager 508, fallback strategy 528, and/or native converter 516 can be implemented/hosted on a single server system or separate server systems. An example of such server system(s) can include an HTTP server system(s).

In some embodiments, strategy manager 508 can apply multiple strategies configured to parse an email and to output results that include relevant content of the email, and strategy manager 508 select the best results. For example, strategy manager 508 can concurrently applies strategies 524, which can be individual routines, modules, or operations that parse an email to identify relevant content in the email. For example, some strategies 524 can be HTML parsing strategies. Individual strategies 524 can be specifically configured for individual message providers 108. For example, a particular one of message providers 108 can use a particular format for its emails. Such formats can include an HTML structure or CSS (Cascading Style Sheets), and such formats can include patterns that indicate particular parts of an email. Such parts of an email can be message boundaries that separate emails in a thread, and fields that include contents, such as names of senders and recipients; date stamps; signatures; messages; and so on. In some embodiments, a particular one of strategies 524 that corresponds to a particular one of message providers 108 will output the best results when applied to an email from the particular one of message providers 108. Multiple strategies 524 can be concurrently applied.

In some embodiments, strategies 524 can identify a latest contribution in an email. For example, with reference to FIG. 6, which shows latest email 116 and corresponding conversation 226 of FIGS. 2-3 in message windows 604, 608, respectively. According to this example, a strategy 524 can be applied to latest email 116, which is part of thread 222 and which includes in its reply text 206 previous emails 212, 216, 220, to locate first message boundary 612, which separates latest email 116 from previous email 212. The strategy 524 can also identify relevant content above message boundary 612 (e.g., message 132*a*, sender's name 136*a*, a receipt date 140*a*) as being relevant content of latest email 116. This relevant content of latest email 116 can be referred to as latest contribution to conversation 226, or as latest contribution to thread 222.

Referring again to FIG. 5, in some embodiments, native converter 516 can receive relevant content from strategy manager 508, and convert the relevant content to a native format. Native converter 516 can also send the relevant content in the native format to mailbox service layer 408, which can provide the relevant content in the native format to a client app of client device 100 for display to a user. For example, with reference to FIG. 6, native converter 516 can receive from strategy manager 508 HTML data that includes message 132*a*, sender's name 136*a*, and a receipt date 140*a*, along with an indication that such HTML data constitutes the relevant content of latest email 116. Native converter 516 can convert the relevant content from HTML to a native format that includes flat text with custom styling and send the relevant content to mailbox service layer 408, which can provide the relevant content in the native format to client device 100 for presentation to a user as the latest contribution to conversation 226. As illustrated, custom styling of the native format can include chat box 144, in which the relevant content (i.e., message 132*a*, sender's name 136*a*, and a receipt date 140*a*) can be included as flat text.

Figure 7:
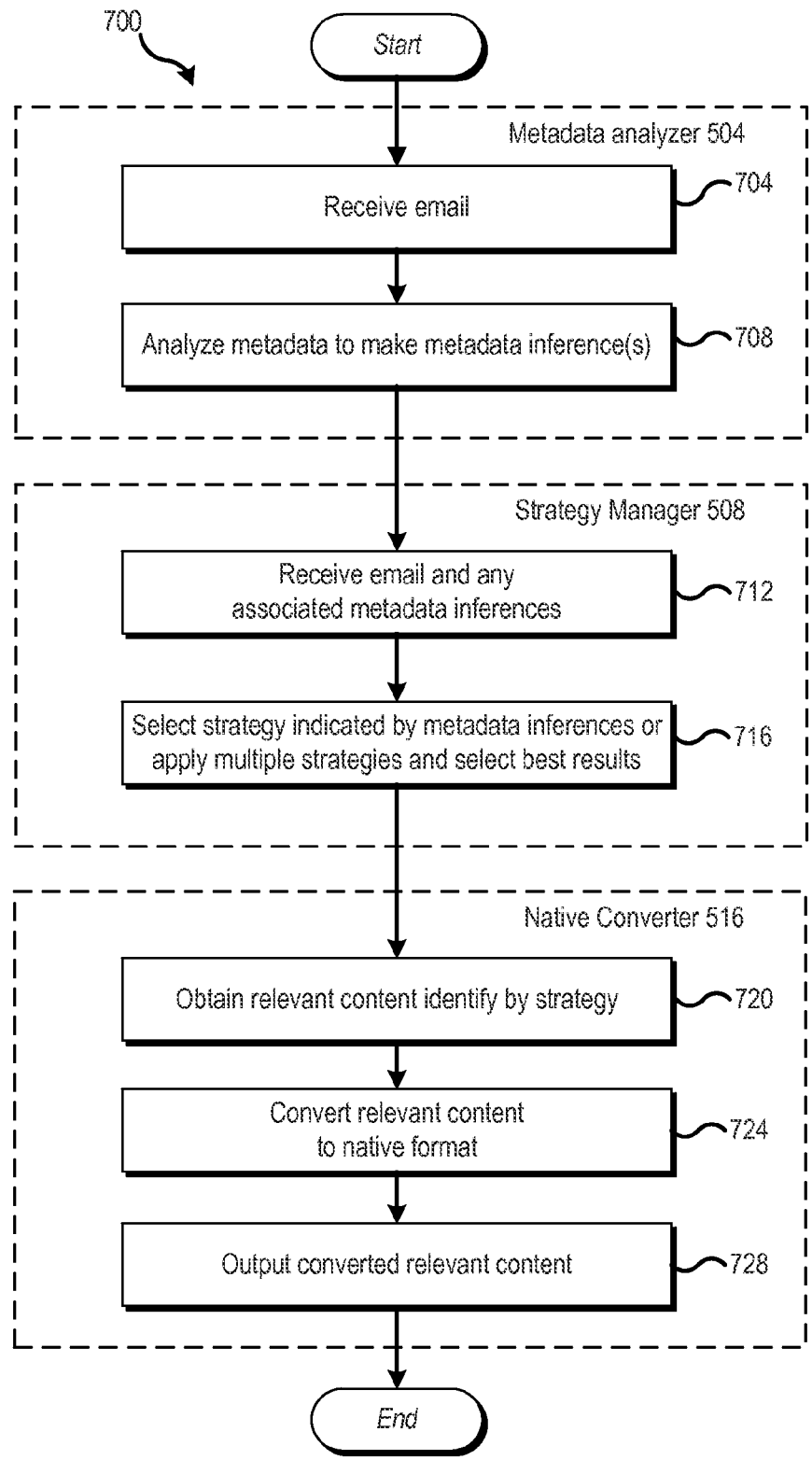
FIG. 7 shows a flow diagram of a process that can be implemented by the service module of FIG. 5 to identify relevant content in an email and to convert the relevant content to a native format, in accordance with embodiments of the present invention.

FIG. 7 shows a flow diagram of process 700 that can be implemented by components 504, 508, 516 of service module 420*a* to identify relevant content in an email and to convert identified relevant content to a native format, in accordance with some embodiments of the present invention. Process 700 is described herein as being implemented by specific components of service module 420*a*. However, it should be appreciated that process 700 (or portions thereof) can be implemented by any module, routine, application, operation, etc. on any server or any portion thereof. For example, process 700 can be implemented by other service modules, such as service modules 420*b-c*, message service layer 404, mailbox service layer 408, or any component of message management service 112. It should be also appreciated that process 700 can be implemented on a client device (e.g., client device 100) and/or collaboratively implemented by a client device and a server.

In some embodiments, metadata analyzer 504 and strategy manager 508 can implement sub-processes represented at blocks 704, 708, 712, 716 of process 700 to identify relevant content in an email, and native converter 516 can implement sub-processes represented by blocks 720, 724, 728 to convert identified relevant content to a native format. Embodiments for implementing sub-processes represented at blocks 704, 708, 712, 716 to identify relevant content in an email are described herein with reference to FIGS. 7 and 8-19. Embodiments for implementing sub-processes represented at blocks 720, 724, 728 to convert identified relevant content to a native format are described herein with reference to FIGS. 7 and 20-22.

Turning now to FIGS. 7 and 8-19, embodiments are described for identifying relevant content in an email.

Process 700 of FIG. 7 can generally begin at block 704, where an email can be received. For example, service module 420*a* can receive an email from one of message providers 108. In some embodiments, as illustrated, metadata analyzer 504 of service module 420*a* can receive an email from one of message providers 108. For example, metadata analyzer 504 can receive email 116 of FIGS. 1-3 and 6 from one of message providers 108. In some embodiments, email 116 can be in an HTML format and it can include in its reply text 206 previous emails 212, 216, 220 of thread 222.

Figure 8:
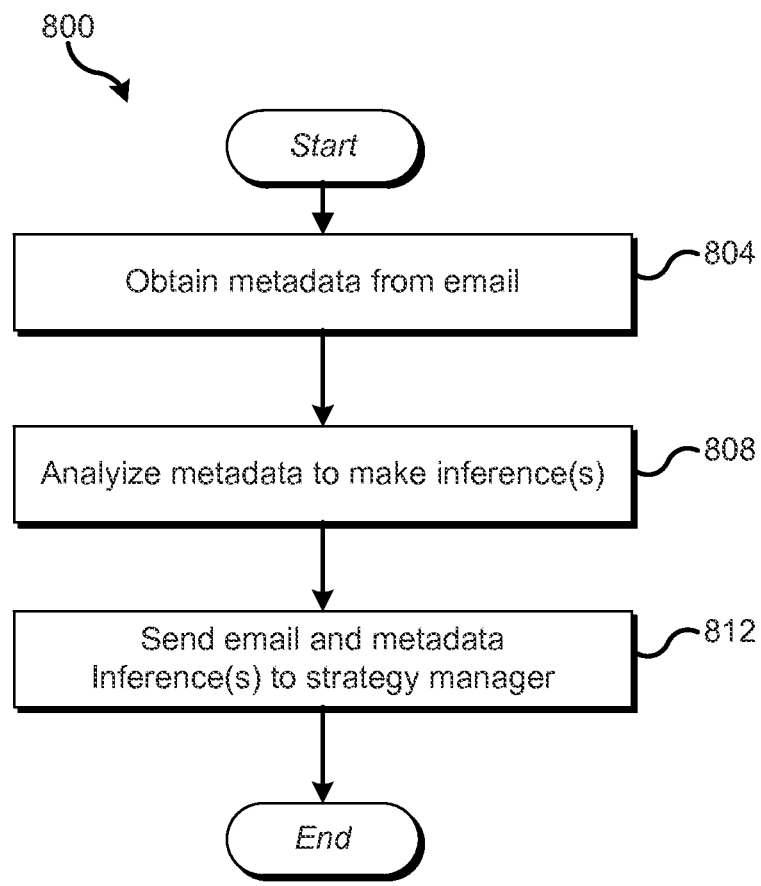
FIG. 8 shows a flow diagram of a process for analyzing metadata of an email in accordance with embodiments of the present invention.

As indicated at block 708, process 700 can involve analyzing metadata of an email to make metadata inferences about the email that can be used to select which strategy to use to identify relevant content in the email. For example, metadata of the email received according to block 704 can be analyzed to make metadata inferences about the email, and such metadata inferences can be considered when selecting a strategy to be applied to the email to identify relevant content in the email. FIG. 8 shows a flow diagram of process 800 for analyzing metadata of an email to make such metadata inferences in accordance with embodiments of the present invention. Process 800 can be described herein as being implemented by metadata analyzer 504 of service module 420*a*. However, it should be appreciated that process 800 can be implemented by any application, routine, operation, service, etc. on any server or any portion thereof. For example, process 800 can be implemented by any one or more of components of any one or more of service modules 420, message service layer 404, mailbox service layer 408, or any component of message management service 112. It should be also appreciated that process 800 can be implemented on a client device (e.g., client device 100) and/or collaboratively implemented by a client device and a server.

As indicated at block 804, process 800 can generally begin with obtaining metadata from an email. In some embodiments, metadata analyzer 504 of one of service modules 420 can receive an email. For example, metadata analyzer 504 can be the component of service module 420*a* that first receives an email from one of message providers 108. In some embodiments, metadata of an email includes all or some of the email's header data. In such embodiments, metadata analyzer 504 can obtain metadata from an email by obtaining its header data, which can include sender's and recipient's name and email address, a timestamp, sender's client device identifier, sender's client app identifier, message provider identifier, message identifier, thread identifier, a subject, location information, etc.

At block 808, process 800 can involve analyzing obtained metadata to make inferences about the email. For example, metadata analyzer 504 can infer that an email is an original email that is not part of a thread (referred to herein as an "original-email" inference). An original-email inference can be made if the email does not include reply or forward header data or if the email's message identifier matches its thread identifier. Also, for example, metadata analyzer 504 can infer which client app and/or which particular one of message providers 108 is associated with an email if its metadata includes an identifier unique to a particular client app or a particular one of message providers 108, such as a client identifier (e.g., x-header). Also, for example, metadata analyzer 504 can infer which particular one of message providers 108 is associated with an email if that email's metadata includes a "signature" unique to a particular client app or a particular one of message providers 108, such as a distinctive body structure. Further, for example, metadata analyzer 504 can make inferences about the geographic origin of the email (e.g., geographic location of sender) based on metadata, such as an IP address (referred to herein as "geographical" inferences).

At block 812, process 800 involves sending the email and any associated metadata inferences to strategy manager 508, which can use the metadata inferences to inform its strategy-selection decisions. Strategy manager 508 can use such inferences to decide whether and which strategy to use to identify relevant content in an email. For example, strategy manager 508 can use an original-email inference to decide that no strategy is necessary to identify message boundaries in the email because the email is not part of a thread. In such cases, for example, strategy manager 508 can select a strategy that simply identifies and removes irrelevant content, such as a sender's signature block. Further, for example, strategy manager 508 can use an inference about which email app or message provider sent the email to simply select a strategy that corresponds to the particular email app or message provider. Still further, for example, strategy manager 508 can use geographical inferences to make its own inference that an email is written in a particular language, and strategy manager 508 can select a strategy suitable for that particular language. Such metadata inferences can enable strategy manager 508 to "short cut" the strategy-selection process by enabling it to select a strategy rather than applying multiple strategies and selecting the best results.

Referring again to FIG. 7, process 700 can proceed from block 708 to block 712, where an email and any associated metadata inference are received. For example, any metadata inferences made about an email according to block 708, along with other information about an email, can be received. In some embodiments, strategy manager 508 receives an email and any associated metadata inferences from metadata analyzer 504. At block 716, process 700 can select a strategy indicated by any metadata inferences or apply multiple strategies to an email and select the best results.

Embodiments for selecting a strategy indicated by any metadata inferences and/or applying multiple strategies to an email and selecting the best results, as indicated at block 716, are described in more detail with reference to FIGS. 9-19.

Figure 9:
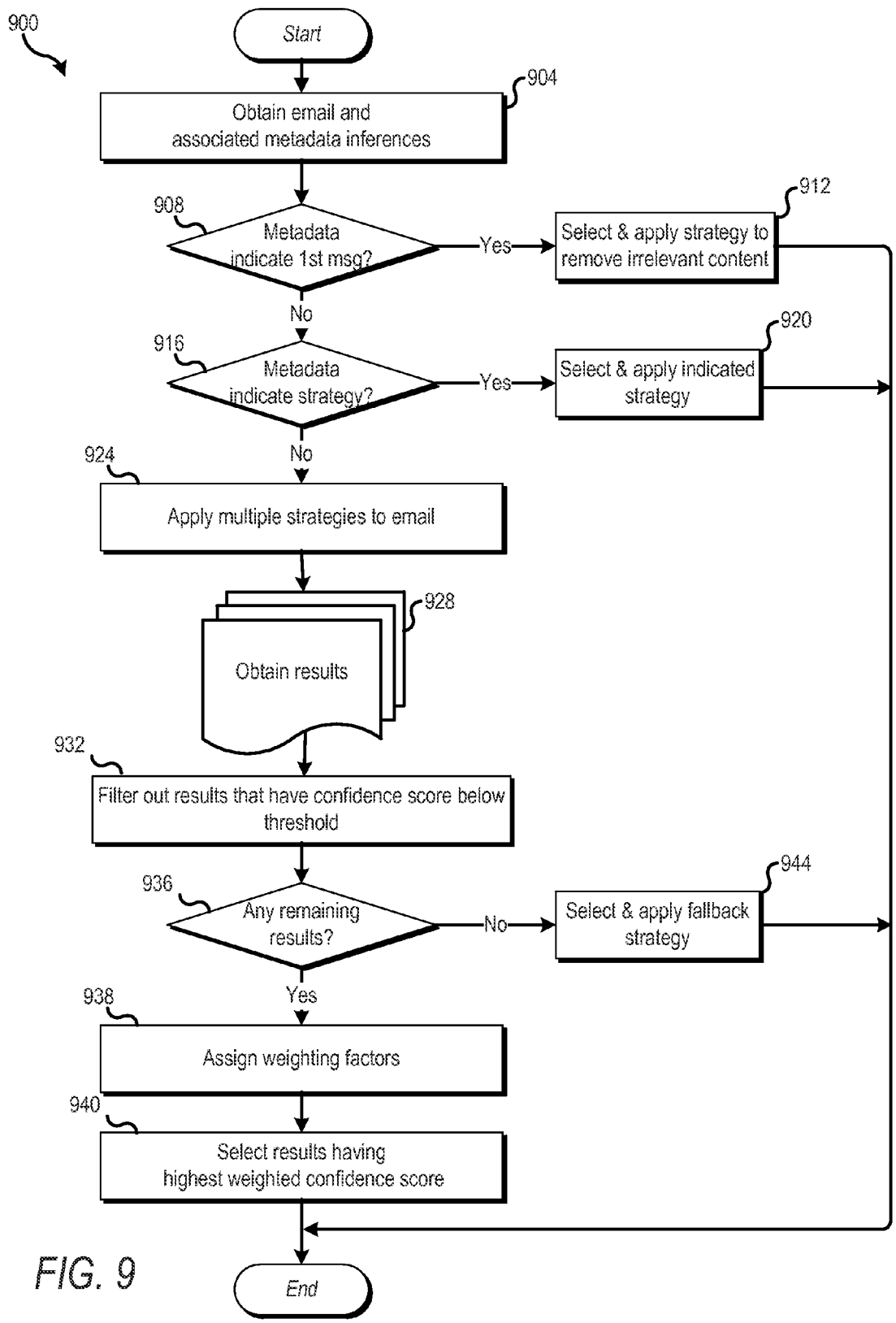
FIG. 9 shows a flow diagram of a process for considering metadata to select a strategy for an email and for applying multiple strategies that attempt to identify relevant content in an email and selecting results from the strategy that returned the highest confidence score in accordance with embodiments of the present invention.

FIG. 9 shows a flow diagram of a process for considering metadata to select a strategy for an email and for applying multiple strategies that attempt to identify relevant content in an email and selecting results from the strategy that returned the highest confidence score in accordance with embodiments of the present invention. Process 900 is described herein as being implemented by strategy manager 508 of service module 420a. However, it should be appreciated that process 900 can be implemented by an application, operation, routine, program etc. on any server or any portion thereof. For example, process 900 can be implemented by any one or more components of any one or more service modules 420, message service layer 404, mailbox service layer 408, or any component of message management service 112. It should be also appreciated that process 900 can be implemented on a client device (e.g., client device 100) and/or collaboratively implemented by a client device and a server.

As indicated at block 904, process 900 can generally begin with obtaining an email and any associated metadata inferences. In some embodiments, strategy manager 508 can obtain an email and any associated metadata inferences from metadata analyzer 504. As indicated at block 908, process 900 can involve determining whether any metadata inferences associated with an email indicate that the email is an original email (i.e., first email of a thread). For example, strategy manager 508 can determine whether metadata analyzer 504 made an original-email inference about the email. As indicated at block 912, in the event of such an original-email inference, process 900 can select and apply a strategy that removes from the email irrelevant content, such as a sender's signature block, sender's and recipient's email address, date stamp, etc, and process 900 can end. Such removal of irrelevant content leaves relevant content, which can be displayed to a user. Since the email is not part of a thread, the selected strategy does not attempt to identify message boundaries in the email. It should be appreciated that, in the event of an original-email inference, rather than selecting a strategy for removing irrelevant content, blocks 908 and 912 can involve determining that no strategy is needed to identify relevant content of a latest email, and process 900 can end.

Referring again to block 908, if no original-email inference is made, process 900 can proceed to block 916, where process 900 can determine whether any metadata inferences associated with an email indicate which particular strategy (including, in some instances, multiple strategies) is suitably configured to identify relevant content in that email. For example, process 900 analyzes metadata inferences associated with an email to inform its decision about which strategy to select. As indicated at block 920, if a metadata inference can be used to select a strategy, process 900 uses the metadata inference to select and apply the appropriate strategy for the email, and process 900 ends. For example, in the event a metadata inference specifies which message provider 108 or client app generated and/or sent an email, process 900 can use this metadata inference to select and apply a strategy 524 configured to identify relevant content in an email that has the particular format used by that message provider 108 or client app. Also, for example, in the event a metadata inference specifies a geographic location of a sender or recipient of an email, process 900 can use this metadata inference to select and apply a strategy 524 configured for a language associated with that geographic location. It should be appreciated that one of ordinary skill in the art will recognize that other metadata inferences can be used to indicate which strategy 524 can be selected for identifying relevant content in an email.

Referring again to block 916, if no associated metadata inferences can be used to select a strategy, process 900 can proceed to block 924, where multiple strategies can be concurrently applied to an email. For example, strategy manager 508 can apply some or all of strategies 524 to an email; multiple strategies can be applied concurrently. Each of strategies 524 can attempt to identify in an email one or more patterns indicative of message boundaries and/or relevant content and output results that include identified message boundaries and/or relevant content and an associated confidence score, which can indicate how closely patterns in an email match patterns a strategy is configured to detect. Accordingly, all or some of strategies 524 can operate in parallel. Applying strategies concurrently, rather than sequentially, can save processing time. For example, some or all strategies 542 can output results at approximately the same time, rather than sequentially outputting results, one at a time. Such parallel processing can decrease the amount of time required to determine which of strategies 524 is best suited to identify message boundaries and/or relevant content in an email.

Figure 10:
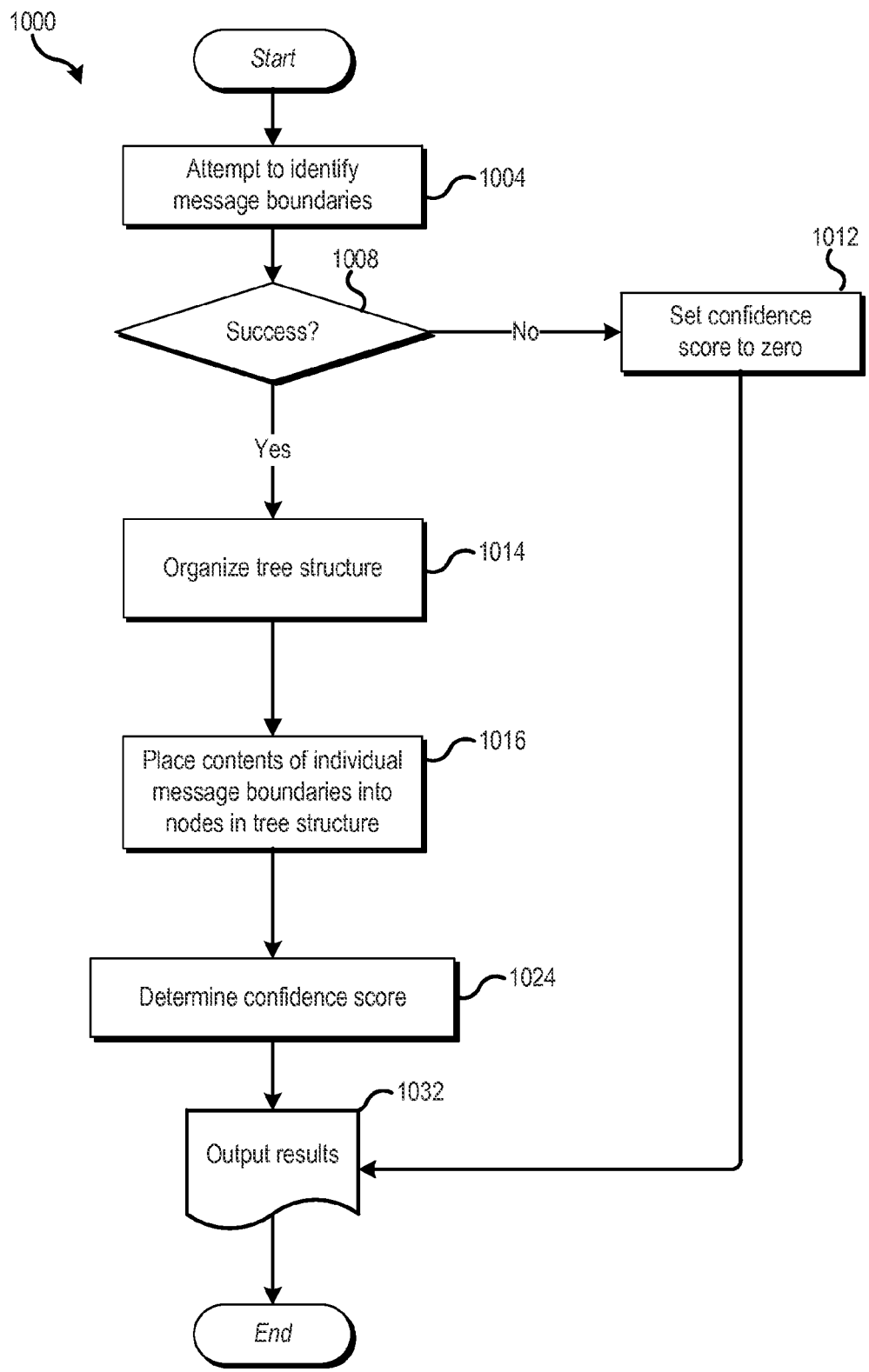
FIG. 10 shows a flow diagram of a process for applying a strategy to an email to identify relevant content in the email in accordance with embodiments of the present invention.

FIG. 10 shows a flow diagram of process 1000 for applying a strategy to an email to identify relevant content in the email in accordance with some embodiments of the present invention. Process 1000 can be implemented by some or all of strategies 524. For example, when strategy manager 508 applies one of strategies 524 to an email, that strategy implements process 1000 to identify message boundaries and/or relevant content in the email. Instead of, or in addition to, being implemented by strategies 524, it should also be appreciated that process 1000 can be implemented by any routine, application, operation, or combination thereof executed on any server or component thereof. For example, process 1000 can be implemented by any of service modules, message service layer 404, mailbox service layer 408, or any component of message management service 112. It should be also appreciated that process 1000 can be implemented on a client device (e.g., client device 100) and/or collaboratively implemented by a client device and a server.

Figure 6:
FIG. 6 shows an example email and a corresponding conversation in accordance with embodiments of the present invention.

Process 1000 generally begins at block 1004, where attempts are made to detect message boundaries in an email. For example, when applied to an email that is part of a thread and that includes in its body previous emails of the thread, an individual one of strategies 524 can attempt to detect one or more message boundaries that separate one or more emails of the thread. An example of such an email can be latest email 116, as shown in FIG. 6. Latest email 116 can include in its body the contents of previous emails 212, 216, 220 of thread 222. An individual one of strategies 524, when applied to latest email 116, can attempt to detect message boundary 612, which separates latest email 116 from previous email 212. It should be appreciated that an individual one of strategies 524 can also attempt to detect message boundaries 616 and 620, which respectively separate previous emails 212 and 216 and previous emails 216 and 220.

In some embodiments, individual strategies 524 can be specifically configured for email formats used by individual message providers 108. Accordingly, a particular one of strategies 524 that is specifically configured for an email format used by a particular one of message providers 108 can be the appropriate strategy to be applied to identify relevant content in an email from that particular one of message providers 108.

In some embodiments, a pattern in an email format used by a particular one of message providers 108 can correspond to a message boundary. Such a pattern that corresponds to a message boundary is sometimes referred to herein as a "message-boundary" pattern. Examples can include HTML patterns, text patterns, etc. Accordingly, to detect a message boundary in an email, an individual one of strategies 524 can be configured to detect in an email format a pattern that corresponds to a message boundary.

In some embodiments, a message provider 108 can use a particular email format for a particular type of email. Types of emails can include a reply, a forward, a latest reply, and a latest forward. For example, a message provider 108 can use one email format for a reply and another email format for forwards. Also for example, a message provider 108 can use one email format for a latest reply in a thread and another email format for a latest forward in a thread. Such email formats can include a pattern (e.g., HTML pattern, text pattern, etc.) that corresponds to a message boundary. Accordingly, in some embodiments, a strategy 524 can be configured to detect a particular email format and/or detect in the email format one or more patterns that correspond to one or more message boundaries.

In some embodiments, a single email format can include multiple patterns, and each pattern can correspond to a different type of message boundary such as a type that separates a reply from a previous email; a type that separates a forward from a previous email; a type that separates a latest reply in a thread from a previous email; a type that separates a latest forward in a thread from a previous email; a type that separates a latest reply having an in-line edit from a previous email in a thread; etc. Accordingly, in some embodiments, an individual one of strategies 524 can attempt to detect a particular type of message boundary.

FIGS. 11-15 illustrate example email formats and patterns that can correspond to message boundaries in accordance with embodiments of the present invention.

FIG. 11 shows a portion of email format 1104 of a reply in a thread in accordance with embodiments of the present invention. Email format 1104 can include a pattern that corresponds to a type of message boundary that separates a reply from a previous email in a thread. For example, pattern 1108 can indicate message boundary 1112 between reply 1116 and previous email 1120 in thread 1124. Thus, a strategy 524 can be configured to detect pattern 1108 and associate pattern 1108 with a type of message boundary that separates a reply from a previous email. In the illustrated example, a strategy 524, upon recognizing email format 1104 and/or detecting pattern 1108, can be configured to indicate that message boundary 1112 can be located after text line 1128.

FIG. 12 shows a portion of email format 1204 of a forward in a thread in accordance with embodiments of the present invention. Email format 1204 can include a pattern that corresponds to a type of message boundary that separates a forward from a previous email in a thread. For example, pattern 1208 can indicate message boundary 1212 between forward 1216 and previous email 1220 in thread 1224. Thus, a strategy 524 can be configured to detect and associate pattern 1208 with a type of message boundary that separates a forward from a previous email. In the illustrated example, a strategy 524, upon detecting pattern 1208, can be configured to indicate that message boundary 1212 can be located after text line 1228, so as to include forwarded email 1232 in forward 1216.

FIG. 13 shows a portion of email format 1304 of a latest reply in a thread in accordance with embodiments of the present invention. Email format 1304 can include a pattern that corresponds to a type of message boundary that separates a latest reply from a previous email in a thread. Such pattern can indicate that some or all contents above the identified message boundary are part of a latest contribution to the conversation (e.g., relevant content of a latest email in a thread). For example, pattern 1308 can indicate message boundary 1312 between latest reply 1316 and previous email 1320 in thread 1324. Thus, a strategy 524 can be configured to detect and associate pattern 1308 with a type of message boundary that separates a latest reply from a previous email in a thread. In the illustrated example, a strategy 524 can be configured to indicate that message boundary 1312 can be located after text line 1328.

FIG. 14 shows a portion of email format 1404 of a latest forward in a thread in accordance with embodiments of the present invention. Email format 1404 can include a pattern that corresponds to a type of message boundary that separates a latest forward from a previous email in a thread. Such pattern can indicate that some or all contents above the identified message boundary are part of a latest contribution to a conversation (e.g., relevant content of a latest email in a thread). For example, pattern 1408 can indicate that message boundary 1412 separates latest forward 1416 and previous email 1420 in thread 1424. Thus, a strategy 524 can be configured to detect and associate pattern 1408 with a type of message boundary that separates a latest forward from a previous email in a thread. In the illustrated example, a strategy 524 can be configured to indicate that message boundary 1412 can be located after text line 1428, so as to include forwarded email 1432 in latest forward 1416.

Figure 15:
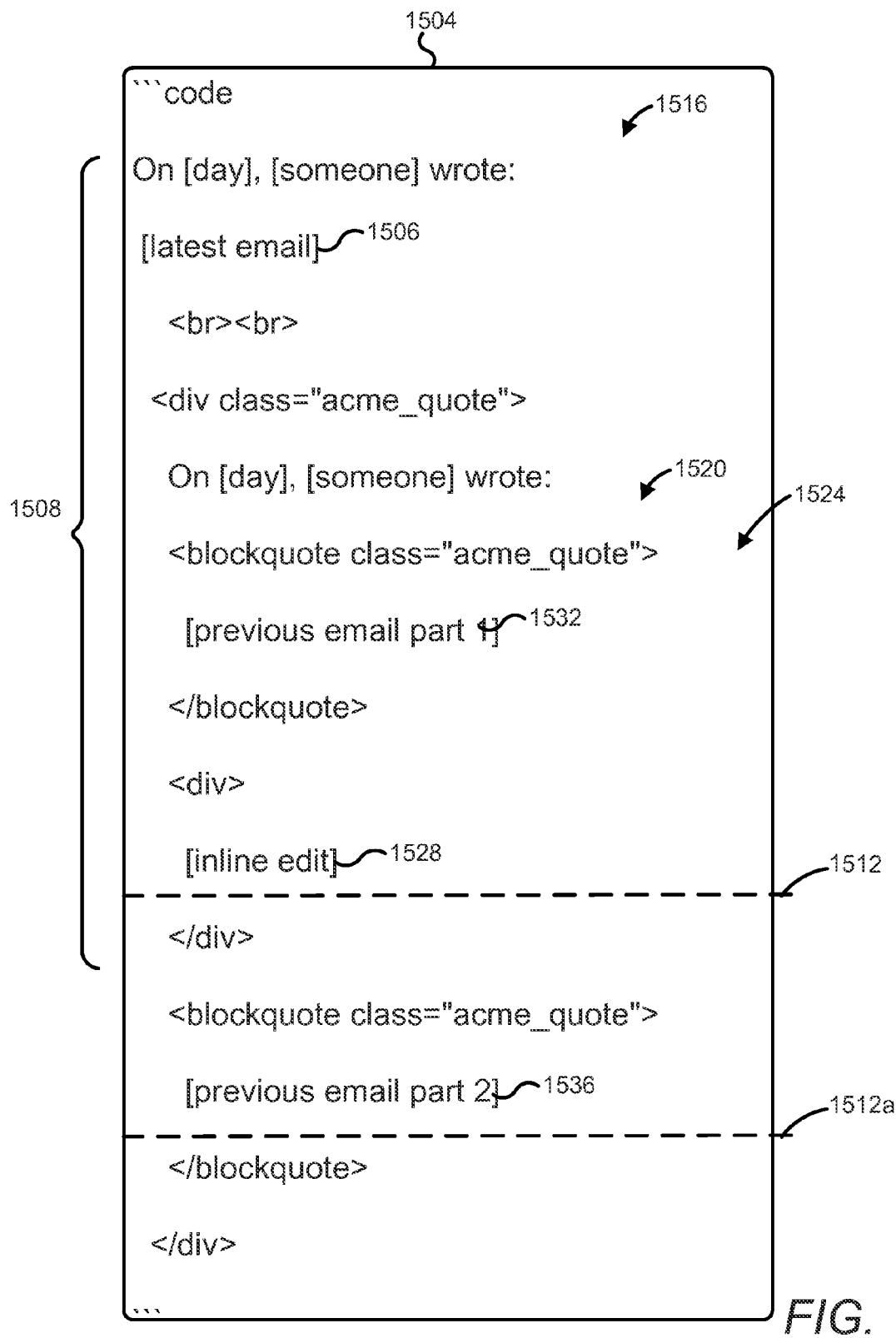
FIG. 15 shows a portion of an email format of a latest reply in a thread, where the latest reply includes an in-line edit, in accordance with embodiments of the present invention.

FIG. 15 shows a portion of email format 1504 of a latest reply in a thread, where the latest reply includes an inline edit to content from a previous email, in accordance with embodiments of the present invention. Email format 1504 can include a pattern that corresponds to a type of message boundary that separates a latest reply having an inline edit from a previous email in a thread. Such pattern can indicate that some or all contents above the identified message boundary include latest email 1506 and the in-line edit 1528, both of which may include relevant content constituting the latest contribution to the conversation of thread 1524. For example, thread 1524 can include latest reply 1516 and previous email 1520. Inline edit 1528 can be located in previous email 1520. However, even though it is located in previous email 1520, inline edit 1528 can be considered part of latest reply 1516. Accordingly, an individual one of strategies 524 can be configured to detect pattern 1508, and determine that message boundary 1512 can be located just before inline edit 1528, so that inline edit 1528 can be included in latest reply 1516.

In some embodiments, to provide context for inline edit 1528, first part 1532 of previous email 1520 can also be included in latest reply 1516. Thus, message boundary 1512 can be located just before inline edit 1528. In other embodiments, a strategy 524 can be configured to determine that message boundary 1512*a* can be located just before second part 1536 of previous email 1520, so that all of previous email 1520 can be included in latest email 1516. Thus, a strategy 524 can be configured to detect and associate pattern 1508, and to determine that message boundary 1512*a* can be located just before second part 1536 of previous email 1520. In some embodiments, a strategy 524 can be configured to ignore inline edits that are not followed by additional text. For example, a strategy 524 could be configured to ignore inline edit 1528 if it is not followed by second part 1536 of previous email 1520. This can be because such inline edits can be an irrelevant signature block added by an email client of the sender of the latest email.

Referring again to FIG. 10, upon attempting to detect message boundaries, such as message boundaries 1112, 1212, 1312, 1412, 1512*a-b*, process 1000 can proceed from block 1004 to block 1008, where process 1000 can determine if any message boundaries of an email were successfully detected. In some embodiments, an individual one of strategies 524 can be a query that can be applied to an email to detect patterns that indicate message boundaries. For example, an email can be an HTML document that includes HTML patterns that correspond to message boundaries. Also, for example, an email can be a text document that includes text patterns that correspond to message boundaries. As indicated at block 1012, if a strategy 524 does not detect in an email a pattern that indicates a message boundary, process 1000 can set to zero a confidence score for that strategy 524, as it applies to that particular email. At block 1032, process 1000 can output results that indicate a confidence score of zero for that strategy 524.

On the other hand, as indicated at block 1014, if a strategy 524 does detect in an email a pattern that corresponds to a message boundary, process 1000 can organize a tree structure that represents the email (or a thread to which the email belongs), and at block 1016, process 1000 can place the contents located within detected message boundaries into separate nodes. For example, in the event an email is an HTML document, process 1000 can convert the HTML document into a tree of nodes, defined by detected message boundaries. At block 1016, process 1000 can place in each node relevant content located within the corresponding message boundaries. In some embodiments, if an email is part of a thread and other messages in that thread have been previously processed, information from such previous processing can be used to further define a tree structure for the email; thus, the tree structure for a particular email can be partially or fully defined at the outset of process 1000.

In some embodiments, to identify relevant content to be included in nodes, strategies 524 can be configured to detect patterns associated with relevant content in email formats. For example, with reference to FIG. 13, a strategy 524 can recognize email format 1304 and detect patterns associated with relevant content in email format 1304, such as latest email 1330, which can be the message of the latest reply, sender name 1334, and receipt date 1338. It should be appreciated that, in addition to or instead of detecting patterns, strategies 524 can be configured to identify line numbers in an email format as line numbers having relevant content, to identify keywords as being relevant content, etc.

An example is described with reference to FIG. 16, which shows latest email 116 of FIGS. 2-3 and 6 in message window 1604 and corresponding nodes 1608 in accordance with embodiments of the present invention. In operation, at block 1016, process 1000 can include in first node 1612 relevant content of email 116, which can be located between message boundaries 616 and 620. Such relevant content can include message 132*a*, sender's name 136*a*, and receipt date 140*a*. Process 1000 can include in second node 1616 relevant content of previous email 212, which can be located between message boundaries 612 and 616. Such relevant content can include message 132*b*, sender's name 136*b*, and receipt date 140*b*. Process 1000 can include in third node 1620 relevant content of previous email 216, which can be located between message boundaries 616 and 620. Such relevant content can include message 132*c*, sender's name 136*c*, and receipt date 140*c*. Process 1000 can include in fourth node 1626 relevant content of previous email 220, which can be located below message boundary 920. Such relevant content can include message 132*d*, sender's name 136*d*, and receipt date 140*d*.

Figure 16:
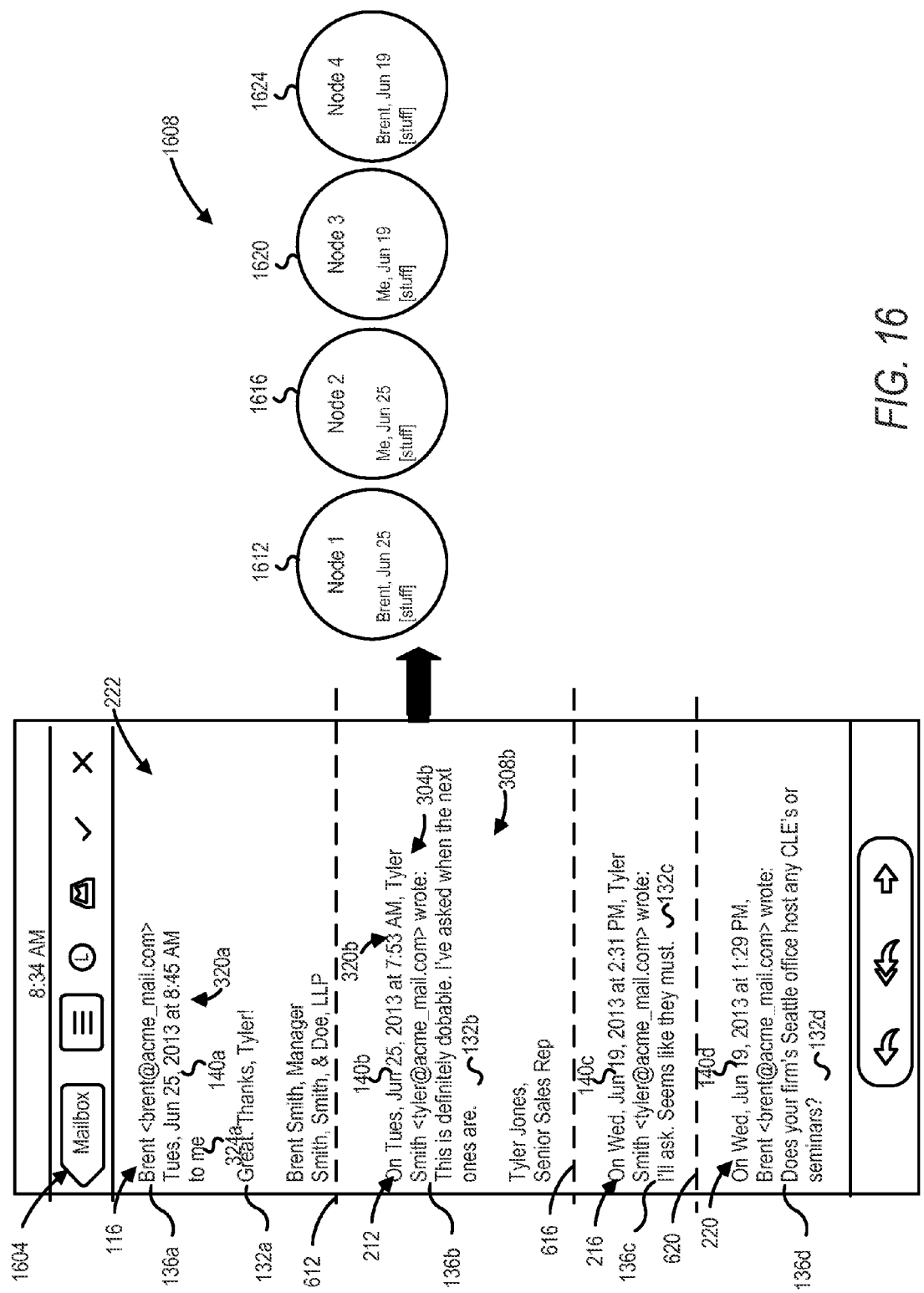
FIG. 16 shows the example email of FIGS. 1-3 and 6 and corresponding nodes in accordance with embodiments of the present invention.
Figure 17:
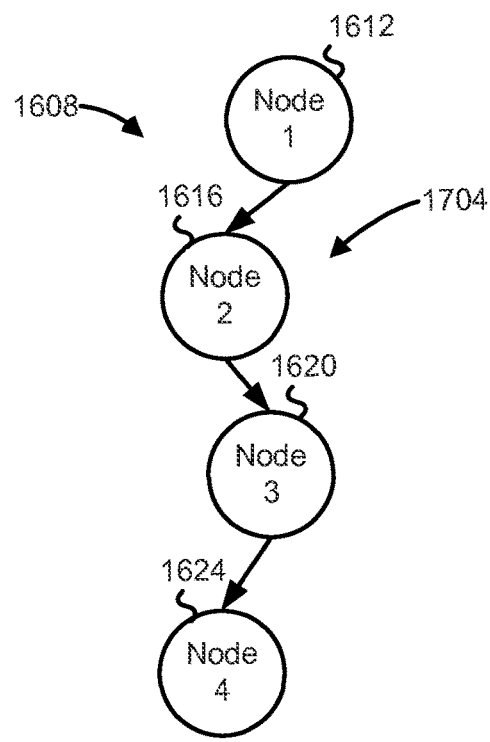
FIG. 17 shows the nodes of FIG. 16 organized into a tree structure in accordance with embodiments of the present invention.

FIG. 17 shows nodes 1608 of FIG. 16 organized into tree structure 1704 in accordance with embodiments of the present invention. Node 1612 can be the highest node in tree structure 1704 and can include relevant content of latest email 116. As previously noted with reference to FIGS. 2-3, latest email 116 can be the latest message in thread 222 and its relevant content can be the latest contribution to conversation 226. Accordingly, node 1612 can include relevant content of latest email 116. Node 1616 can include relevant content of email 212, and node 1620 can include relevant content of email 216. Node 1624 can be the deepest node in tree structure 1704, and it can include relevant content of original email 220 in thread 222. Each node 1612, 1616, 1620, 1624 can represent an individual contribution to conversation 226, and together nodes 1612, 1616, 1620, 1624 can represent conversation 226.

In some embodiments, the organized tree of nodes, such as 1704, can represent a conversation of a thread. Accordingly, a strategy 524 can construct a conversation by executing the sub-processes represented by blocks 1004, 1016, 1020. For example, organized tree 1704 can represent conversation 226 of thread 222, and can be sent to native converter 516 for converting to a native format. In some embodiments, organized tree 1704 can be an HTML DOM (Document Object Model) tree, where each node 1612, 1616, 1620, 1624 corresponds to, and includes relevant content of emails 116, 212, 216, 220. In some embodiments, a strategy 524 can construct a conversation by identifying one or more of message boundaries 612, 616, 620 of latest email 116 according to block 1004, placing relevant contents of one or more message boundaries 612, 616, 620 into one or more corresponding nodes 1612, 1616, 1620, 1624 according to block 1016, and organizing one or more nodes 1612, 1616, 1620, 1624 into tree structure 1704.

At block 1024, process 1000 can determine a confidence score. For example, each of strategies 524 implementing process 1000 can determine a confidence score that indicates the likelihood that it is the appropriate one of strategies 524 for identifying relevant content in a particular email. As noted above, a confidence score can be indicative of how closely a pattern detected in an email matches a message-boundary pattern that strategy 524 can be configured to detect. In some embodiments, in the event a particular strategy 524 detects in an email a pattern that exactly matches a pattern the strategy 524 is configured to identify, then the strategy can determine a high confidence score, such as 1.0.

For example, a particular strategy 524 can be configured to detect in an email a pattern or format (e.g., format 1104 and/or pattern 1108) that a particular email provider 108 always uses for reply messages. If the particular strategy 524 detects such pattern in an email, then the particular strategy 524 can assign a high confidence score, such as 1.0. On the other hand, if the particular strategy 524 detects a similar but not identical pattern in an email, then the particular strategy 524 can assign a moderately high confidence score, such as 0.7. Such variations may be the result of a malicious modification of the email format, or the result of a user intentionally or inadvertently adding or changing the format before sending.

In another example, like the example above, a particular strategy 524 can be configured to detect in an email a pattern or format (e.g., format 1104 and/or pattern 1108) that a particular email provider 108 uses for reply messages. However, in this example, the particular email provider 108 sometimes varies the pattern. In the event the particular strategy 524 detects in an email a pattern that exactly matches that pattern, then the particular strategy 524 can assign a moderate confidence score, such as 0.7. It may not assign a high confidence score, such as 1.0, because the particular message provider 108 sometimes varies the pattern, or because the particular message provider 108 may not use specific identifiers. In the event the particular strategy 524 detects in an email a pattern that closely, but not exactly, matches this pattern, then the particular strategy 524 can assign a moderate confidence score, such as 0.5. On the other hand, in the event the particular strategy 524 detects in an email a pattern that shares some but not a majority of characteristics of that pattern, then the particular strategy 524 can assign a moderately low confidence score, such as 0.3.

At block 1032, process 1000 can output results. For example, an individual one of strategies 524 implementing process 1000 can output results that include identified relevant content, such as an email parsed into nodes that contain relevant content and that are organized in a tree structure, and an associated confidence score. As indicated above, with reference to block 1008, strategies 524 that do not identify any message boundaries (i.e., do not detect any patterns or formats that the strategy is configured to detect) in an email output a confidence score of zero. Such strategies 524 can bypass identifying relevant content according to blocks 1016 and 1020, and can simply output results having a confidence score of zero.

Referring again to FIG. 9, at block 928, process 900 can obtain results from the various strategies. For example, process 900 can involve decision manager 508 receiving results that were outputted from multiple strategies 524 according to block 1032 of process 1000. At block 932, process 900 can filter results to remove results with confidence scores below a threshold. For example, decision manager 504 can filter results received from strategies 524 to remove results with a confidence score of zero. In some embodiments, filtering results with a confidence score of zero can filter out most results, because most strategies will not detect any email formats or patterns associated with message boundaries in a particular email.

At block 936, process 900 can determine if any results remain after filtering. If so, process 900 can proceed to block 938, where process 900 can assign weighting factors to confidence scores of the remaining results. In some embodiments, weighting factors can be assigned based at least in part on a location in a tree structure where relevant content was identified. For example, relevant content identified in a highest node of a tree structure can be relevant content of the latest email of a thread (i.e., the latest contribution to a conversation) and can be weighted the most because it likely includes the most recent information. Relevant content identified in a lowest node in a tree structure can be relevant content of an original email of a thread (i.e., the first contribution to a conversation) and can be weighted the least because it likely includes the oldest information in the thread. The highest node can be referred to as the deepest node, and the lowest node can be referred to as the root node. The deepest node can be the farthest node from the root node.

For example, with reference to FIG. 17, if a strategy 524 returns results having relevant content located in first node 1612, which can be a highest node in tree structure 1704, then strategy manager 508 can heavily weight the confidence score associated with those results. Such heavy weighting can be because the highest node 1612 can contain relevant content from latest email 116 in thread 222. On the other hand, for example, if a strategy 524 returns results having relevant content located in node 1624, which can be a lowest node in tree structure 1704, then strategy manager 508 can negatively weight or not weight the confidence score associated with those results. Such negative weighting or not weighting can be because the lowest node can contain relevant content from original email 220 in thread 222. An original email can be the oldest email in a thread and can contain content that may not be relevant to the latest contribution to a conversation.

Figure 18:
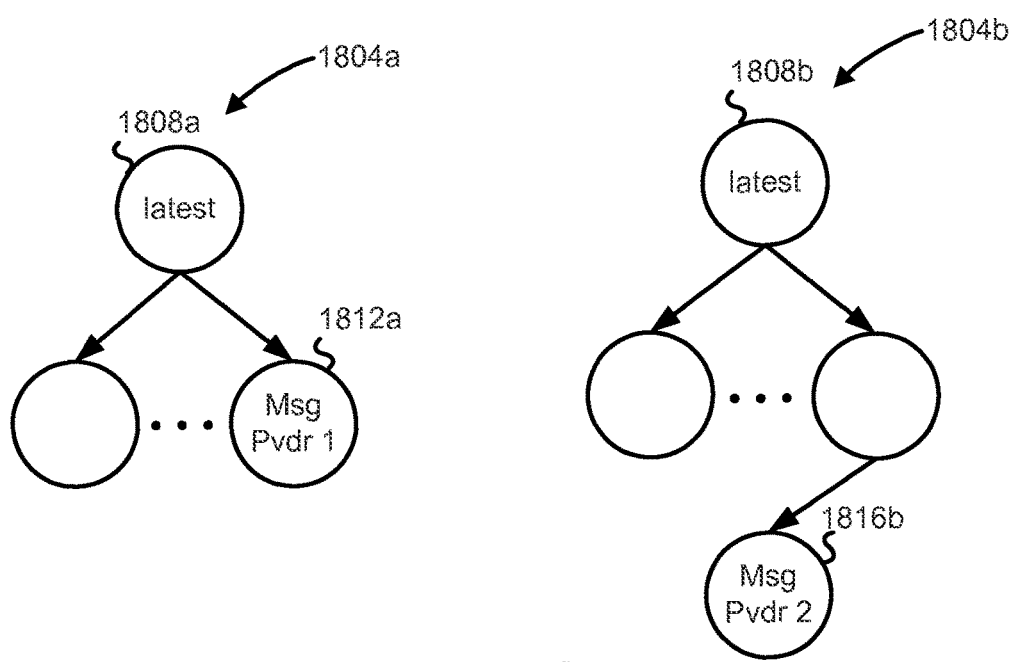
FIG. 18 shows example tree structures for a single email in accordance with embodiments of the present invention.

Another example of weighing confidence scores can be provided with reference to FIG. 18, which shows two tree structures that represent the same email. The email can be part of a thread, and it can include in its reply text relevant and irrelevant content from previous emails in the thread. According to this example, a first one of strategies 524 (e.g., strategy 524*a*) can be configured to detect message boundaries in emails from a first one of message providers 108, and a second one of strategies 524 (e.g., strategy 524*a*) can be configured to detect message boundaries in emails from a second one of message providers 108. Strategy 524*a* can implement aspects of process 1000 to process the email and create tree structure 1804*a*, and strategy 524*b* can implement aspects of process 1000 to process the same email and create tree structure 1804*b*. Nodes 1808*a* and 1808*b* can include relevant content of the email, which is the latest email in its thread. Nodes 1812*a* and 1812*b* can include relevant contents of a previous email that is in the same thread as the email. The previous email associated with nodes 1812*a* can be provided by the first one of message providers 108 (e.g., message provider 108*a*). Node 1816*b* can include relevant contents of an older, previous email that can be in the same thread as the email. The older, previous email associated with node 1816*b* can be provided by the second one of message providers 108 (e.g., message provider 108*b*).

When implementing aspects of process 1000 to identify message boundaries in the email, strategy 524*a* can detect a message boundary for the email whose contents are included in node 1812*a*. This can be because the email included in node 1812*a* was provided by message provider 108*a* and the strategy 524*a* can be configured to detect message boundaries in emails from message provider 108*a*. However, according to this example, strategy 524*b* did not detect a message boundary for the email included in node 1812*a*. Instead, it detected a message boundary for the email whose contents are included in node 1816*b*. This can be because the email whose contents are included in node 1816*b* can be provided by message provider 108*b*, and strategy 524*b* can be configured to detect message boundaries in emails from message provider 108*b*.

Strategy manager 508 can assign a higher weighting factor to the confidence score for results from strategy 524*a* that include relevant content of the email whose contents are in higher node 1812*a*, and strategy manager 508 can assign a lower weighting factor to the confidence score for results from strategy 524*b* that include relevant content of the email whose contents are in lower node 1812*b*. This can be because node 1812*a* is higher in tree structure 1804*a*-*b* than node 1816*b*, which can indicate that the contents of node 1812*a* can be more recent and/or more relevant than the contents of node 1816*b*. Thus, in the event strategy 524*a* and strategy 524*b* determine the same confidence score for their respective results, strategy manager 508 can select results from strategy 524*a* because they have a higher weighting factor.

At block 940, process 900 can select results having the highest weighted confidence score. In some embodiments, in the event results from two or more strategies tie for the highest weighted confidence score, the results that include the longest tree structure are selected. For example, with reference to FIG. 18, if results from strategy 524*a* and results strategy 524*b* tie for the highest weighted confidence score, results from strategy 524*b* can be selected because tree structure 1804*b* is longer than tree structure 1804*a*. The longer tree structure 1804*b* includes more content, and therefore can have a lower likelihood of omitting relevant information. A tie could occur if results from one strategy have a higher confidence score but less weighting, and results from another strategy have a lower confidence score but more weighting. For example, with reference to FIG. 18, results from strategy 524*a*, which identified tree structure 1804*a*, can have a higher confidence score, but results from strategy 524*b*, which identified tree structure 1804*b*, can have higher weighting because tree structure 1804*b* is longer than tree structure 1804*a*. Thus, the results could have the same weighted confidence score. If so, the results of strategy 1804*b* would be selected because those results include a longer tree structure.

Referring again to block 936, if no results remain after filtering out results with confidence scores below a threshold, process 900 can proceed to block 944, where process 900 selects and applies a fallback strategy to identify relevant content in the email. For example, no results above the threshold can occur in cases where an email is received from a particular message provider 108 for which there is no corresponding strategy 524.

Figure 19:
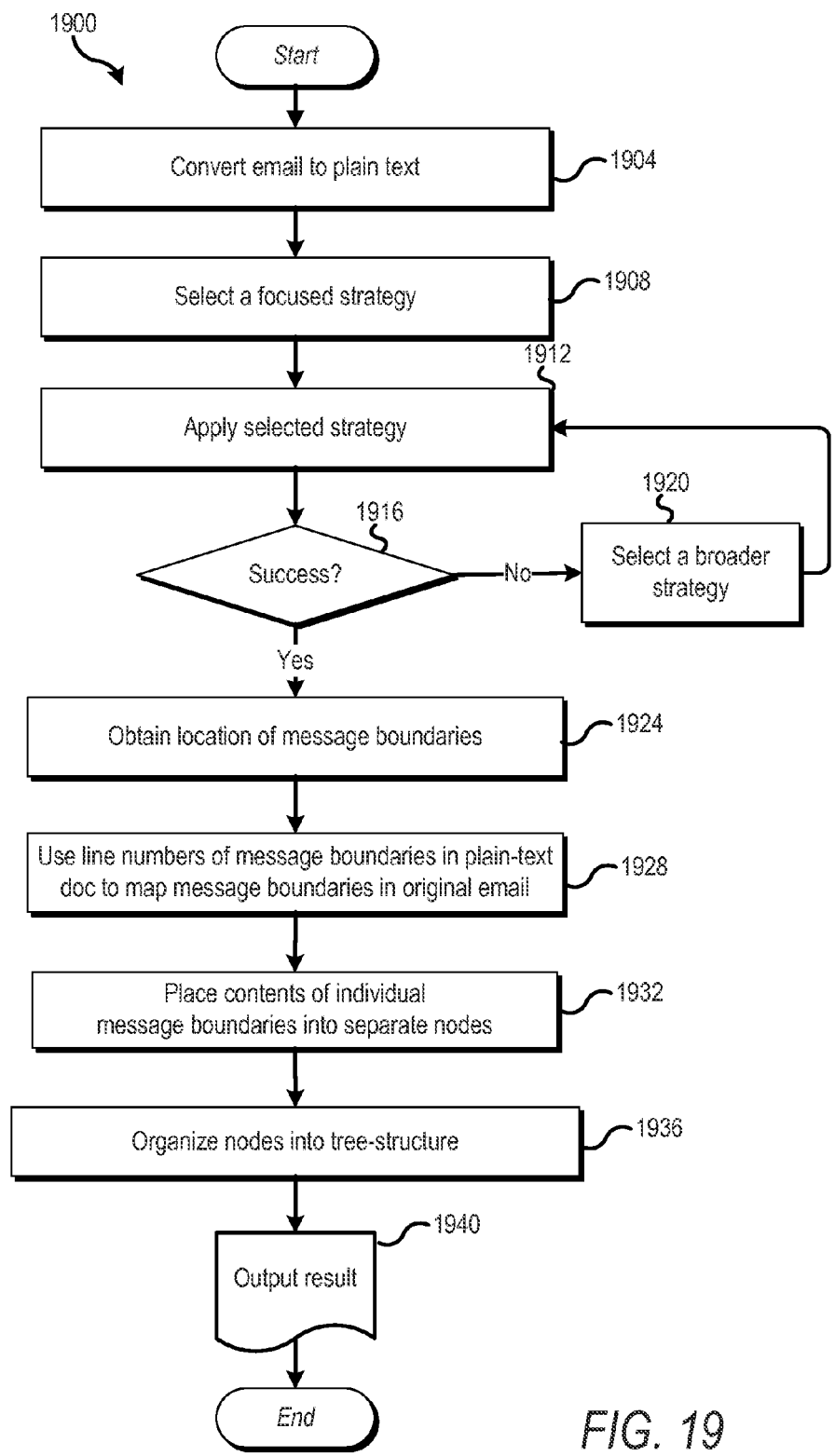
FIG. 19 shows a flow diagram of a process for applying a fallback strategy to identify relevant content in an email in accordance with embodiments of the present invention.

FIG. 19 shows a flow diagram of process 1900 for applying a fallback strategy to identify relevant content in an email in accordance with embodiments of the present invention. Process 1900 can be described herein as being implemented by fallback strategy 528. However, it should be appreciated that process 1900 can be implemented by any application, routine, operation, etc. on any server or any portion thereof. For example, process 1900 can be implemented by one of strategies 524, strategy manager 508, one of service modules 420, message service layer 404, mailbox service layer 408, or any component of message management service 112. It should be also appreciated that process 1900 can be implemented on a client device (e.g., client device 100) and/or collaboratively implemented by a client device and a server.

Process 1900 generally begins at block 1904, where process 1900 can convert an email to plain text. In some embodiments, an email can be in HTML format, and fallback strategy 528 can convert the email from HTML to plain text. For example, when converting, process 1900 can match line numbers of the plain-text version of the email to the HTML version of the email. At block 1908, process 1900 can select a focused strategy to be applied to the plain-text version of the email. In some embodiments, fallback strategy 528 can select from among text-based strategies 532. In some embodiments, similar to embodiment of strategies 524, text-based strategies 532 can review an email to detect patterns that correspond to message boundaries. For example, one text-based strategy 532 can be a text-pattern-matching strategy that can review the plain text of an email to detect patterns in the text that correspond to message boundaries. For example, an individual one of text-based strategies 532 can be configured to detect text patterns, such as "On [date] [email address] sent", "----- forwarded message -----", etc. In some embodiments, at block 1908, fallback strategy 528 can select text-based strategy 532*a*, which can be the most focused strategy. For example, focused text-based strategy 532*a* can be configured to detect a specific pattern that, if detected, strongly indicates that the text-based strategy 532*a* is specifically configured to the email and that text-based strategy 532*a* can accurately identify relevant content in the email.

At block 1912, process 1900 can apply the selected one of text-based strategies 532 to the plain-text version of the email. As noted, application of the selected one of text-based strategies 532 can involve the selected one of text-based strategies 532 reviewing the text of the email to detect patterns in the text that correspond to message boundaries. At block 1916, process 1900 can determine whether the selected one of text-based strategies 532 detected a pattern in the email. At block 1920, if the selected one of text-based strategies 532 did not detect a pattern in the email, process 1900 selects a broader strategy from among text-based strategies 532, and, at block 1912, process 1900 applies the broader strategy. In some embodiments, process 1900 can repeat steps indicated at blocks 1912, 1916, 1920 until a pattern is detected or until the broadest, most generic strategy of text-based strategies 532 is applied to email. In some embodiments, if such broadest strategy does not detect a pattern, process 1900 can determine that the email is an original email and not part of a thread. For example, process 1900 can send the entire email to the native converter 516, which can display the entire email to a user.

On the other hand, as indicated at block 1924, if particular text-based strategy 532 applied at block 1912 detects a pattern in the email, process 1900 can obtain from that strategy 532 locations of message boundaries in the email. In some embodiments, a location of a message boundary in an email can be a line number of a text line in the email that includes a message boundary. For example, fallback strategy 528 can determine the line numbers of the message boundaries in the email. At block 1928, process 1900 can use the line numbers of the respective message boundaries in the plain-text version of the email to map the corresponding message boundaries in the original version of the email. For example, as noted above, the line numbers of the plain-text version of the email can correspond to the line numbers of the original email, which can be in HTML format.

At block 1932, process 1900 can place the relevant contents of individual message boundaries into separate nodes, and, at block 1936, process 1900 can organize the nodes into a tree-structure that can correspond to the conversation in the email. In some embodiments, blocks 1932 and 1936 of process 1900 can correspond to blocks block 1016 and 1020 of process 1000. At block 1940, process 1900 can output results. For example, fallback strategy 528 can output the parsed email, such as a tree-structure of nodes, where each node represents a message in the thread (e.g., tree structure 1704 of FIG. 17 or tree structures 1804*a-b* of FIG. 18).

In some embodiments, after identifying relevant content of an email, the identified relevant content can be converted into a native format for display to a user. Turning now to FIG. 7 and FIGS. 17-18 and 20-22, embodiments are described for converting relevant content to a native format.

Referring to FIG. 7, once a strategy has been selected at block 716, process 700 can proceed to block 720, where process 700 can obtain the relevant content identified by one or more of the strategies. For example, native converter 516 can obtain from strategy manager 508 relevant content included in the selected results (e.g., block 940 of process 900), relevant content that was identified by removing irrelevant content (e.g., block 912 of process 900), or relevant content that was identified fallback strategy 528 (block 948). At block 724, process 700 can convert obtained relevant content to a native format.

Figure 20:
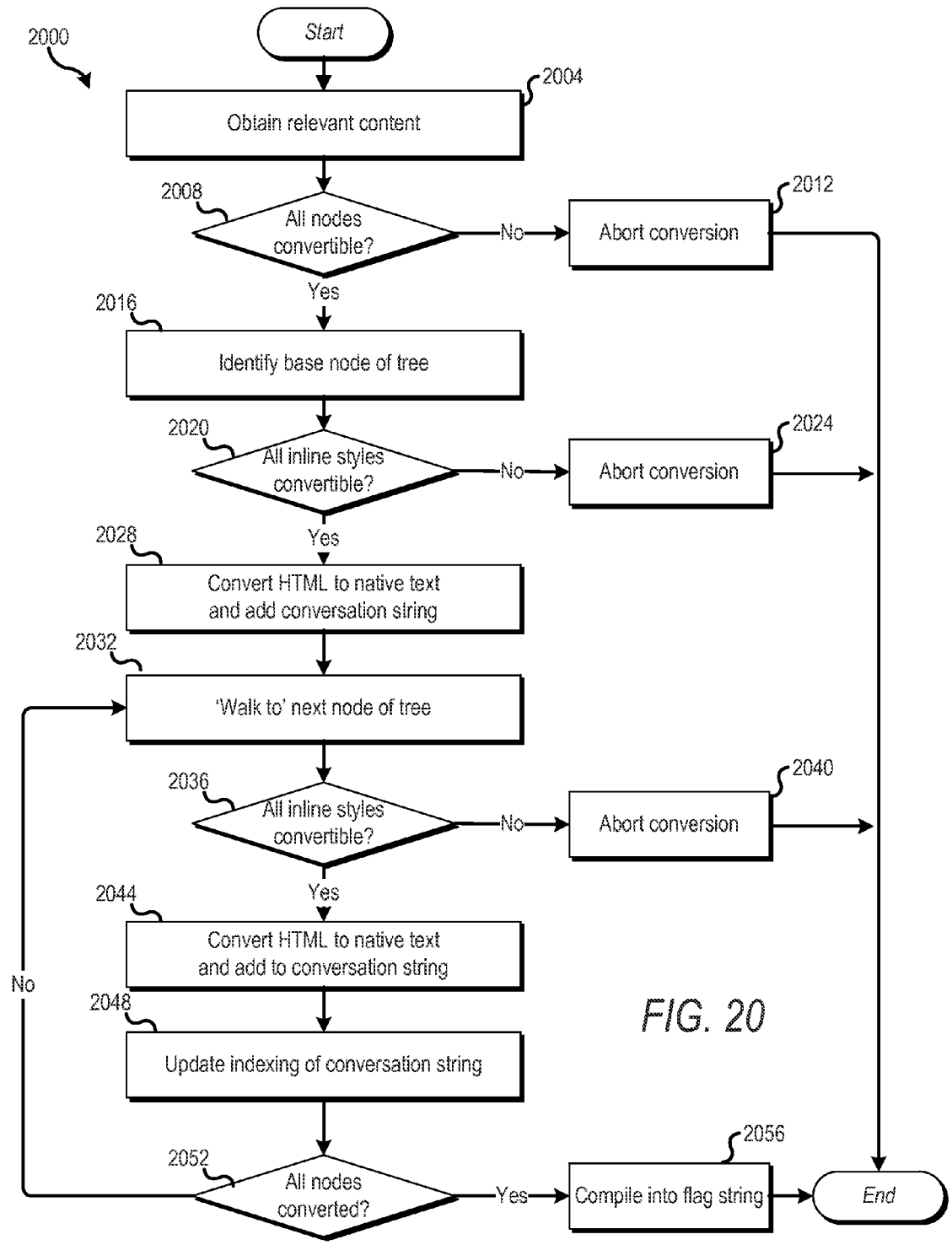
FIG. 20 shows a flow diagram of a process for converting relevant content of an email to a native format in accordance with embodiments of the present invention.

FIG. 20 shows a flow diagram of process 2000 for converting relevant content to a native format in accordance with embodiments of the present invention. In some embodiments, process 2000 can convert relevant content from a format provided by a message provider 108 to a native format. For example, such native message format can be a streamlined data format, and can be designed for efficient delivery and rendering by a client app of a client device 100. Converting to a native format can include converting HTML formatted messages to native rendering format. In some embodiments, the native message format can strip undesired content styling attributes and unnecessary information. In some embodiments, the native rendering format can parameterize aspects of the relevant content into parameters of a data-interchange object.

Process 2000 is described herein as being implemented by native converter 516. However, it should be appreciated that process 2000 can be implemented by any application, routine, operation, etc. on any server or any portion thereof. For example, process 1900 can be implemented by message service layer 404, mailbox service layer 408, any of service modules 420, or any component of message management service 112. It should be also appreciated that process 2000 can be implemented on a client device (e.g., client device 100) and/or collaboratively implemented by a client device and a server.

Process 2000 can begin at block 2004, where process 2000 obtains relevant content. For example, the relevant content can be received by native converter 516 from decision manager 508 as an HTML document that can include nodes arranged in a tree structure that corresponds to the organization of the emails of the thread, where each of the nodes contains contents of an individual emails in the thread. Examples of such tree structures can include tree structure 1704 of FIG. 17 and tree structure 1804*a-b* of FIG. 18. At block 2008, process 2000 can determine if all nodes of a tree structure are convertible. For example, native converter 516 can determine if any nodes in the HTML document are not recognized as "native convertible". In some embodiments, native converter 516 can be configured to recognize and convert to a native format a limited range of HTML elements. For example, native converter 516 can be configured to recognize and convert the following simple HTML tags: <"div">, <"br">, <"p">, <"meta">, <"head">, <"body">, <"b">, <"i">, <"u">, <"a"> and <"span">.

At block 2012, process 2000 can abort the conversion if some nodes are not convertible. For example, if a node of the tree structure includes an HTML element that native converter 516 does not recognize, then native converter 516 can abort conversion and output the email in its original HTML format. On the other hand, at block 2016, if all nodes are convertible, process 2000 can identify a base node of a tree structure. For example, native converter 516 can identify the base node of the tree structure included in the HTML document that was constructed by the one of the strategies 524 or 528 identified by strategy manager 508. For example, with reference to FIG. 17, native converter 516 can identify node 1624 as the base node of tree structure 1704. At block 2020, process 2000 can determine if all in-line styles of the identified base node are convertible. For example, native converter 516 can be configured to ignore, or not to convert, some in-line styles, such as "radio button", "checkbox", "table", etc. Converting some styles can result in complicated, muddled, crowded emails messages. Accordingly, if, at block 2020, not all inline styles are convertible into a simple, easy-to-read format (i.e., native format), process 2000 can abort the conversion at block 2024.

However, if all inline styles are convertible, process 2000 can proceed to block 2028, where process 2000 can convert the contents of the identified base node into a native text and add the converted text to a conversation string or start a conversation string and add the text to the conversation string. For example, native converter 516 can convert text and some simple inline styles and other content formats.

FIG. 21 shows a table 2102 of message-format-conversion mappings in accordance with embodiments of the present invention. In some embodiments, email content formats and/or styling attributes of column 2104 can be mapped to native-format parameters of column 2108. As indicated at row 2116, during conversion, native converter 516 can convert paragraph tags, div tags, HTML tags, header tags, body tags, and other suitable tags to an empty string. As indicated at rows 2120, 2124, and 2128, bold tags, italic tags, and underline tags can be converted to bold, italic, and underline string parameters, respectively. As indicated at row 2132, anchor tags can be converted to link parameters that include detailed text and URI (Uniform Resource Identifier) reference. It should be appreciated that any suitable tag may be mapped to a parameter defined for the message.

Referring again to FIG. 20, when converting according to block 2028, native converter 516 can be configured to ignore "decorative" inline styles, such as "font", "text", "color", "border", "margin", and "height", etc. Such "decorative" inline styles can be ignored because doing so will not change the substantive message. Instead, doing so merely changes cosmetics, such as color, font, etc. Converting text and basic inline styles and content format, while ignoring "decorative" line styles, can result in simple, easy to read conversations, such as conversation 226.

At block 2032, process 2000 can walk to the next node in the tree structure, and, at block 2036, process 2000 can determine if all inline styles in that node are convertable. If not, at block 2040, process 2000 can abort the conversion. However, if all inline styles are convertible, at 2044, process 2000 can convert the contents of that node into a native text, and add the converted text to the conversation string.

In some embodiments, native converter 516, when implementing process 2000, can recursively walk the tree structure at block 2032. For example, the tree structure may be provided as an HTML DOM tree, and native converter 516 can recursively walk from node to node, converting contents of each node along the way. Such "recursive conversion" can result in spacing offsets in embodiments where each recursive node that is converted is indexed based on only its own context, which can start at index 0. In these embodiments, every recursive traversal up the tree has to re-offset every style's index at each level up the tree. This can be further complicated by spacing rules that arise from block nodes versus inline nodes and the various ways that email clients can inject random invalid spaces or "ignorable" spaces throughout the conversation. Accordingly, at block 2048, process 2000 can update indexing of the conversation string after adding new converted text to the conversation string.

At block 2052, process 2000 can determine if all nodes of the tree structure have been converted. If not, process 2000 can return to block 2032, where it can "walk" to the next unconverted node. However, if all nodes of the tree structure have been converted, process 2000 can proceed to block 2056, where process 2000 can compile the conversation string into a flat-text string. FIG. 22 shows a native message format 2204 in accordance with embodiments of the present invention. Native message format 2204 can be a flat-text string 2208 that can include plain-text string 2208 of the relevant content of the thread and custom stylings 2212. In some embodiments, native message format 2204 can include an "is HTML" parameter 2216 that selectively enables native or HTML rendering of all or part of a message on the client application. One added benefit is this can enable a consistent style to be applied to the message content.

Referring again to FIG. 7, upon converting relevant content to a native format, process 700 can proceed to block 728, where process 700 can output converted relevant content. For example, native converter 516, after converting the relevant content to a native format, can provide the converted relevant content to mailbox service layer 408, which can make available the converted relevant content to an email app of client device 100. Client app of client device 100 can present the relevant content to a user in a native format. For example, with reference to FIG. 2, window 204 shows email 116 in an HTML format provided by a particular one of message providers 108, whereas message window 230 shows relevant content of email 116 in a native format.

Embodiments of the present invention are now described that can receive a text-only email from one of message providers 108, identify relevant content in the text-only email, and convert the relevant content to a native format. For example, text-only emails can be difficult to parse, because it can be difficult to identify message boundaries in such emails. In some instances, regressional analysis can be used to sequentially apply a number of strategies until a strategy detects a pattern in the text-only message.

Figure 23:
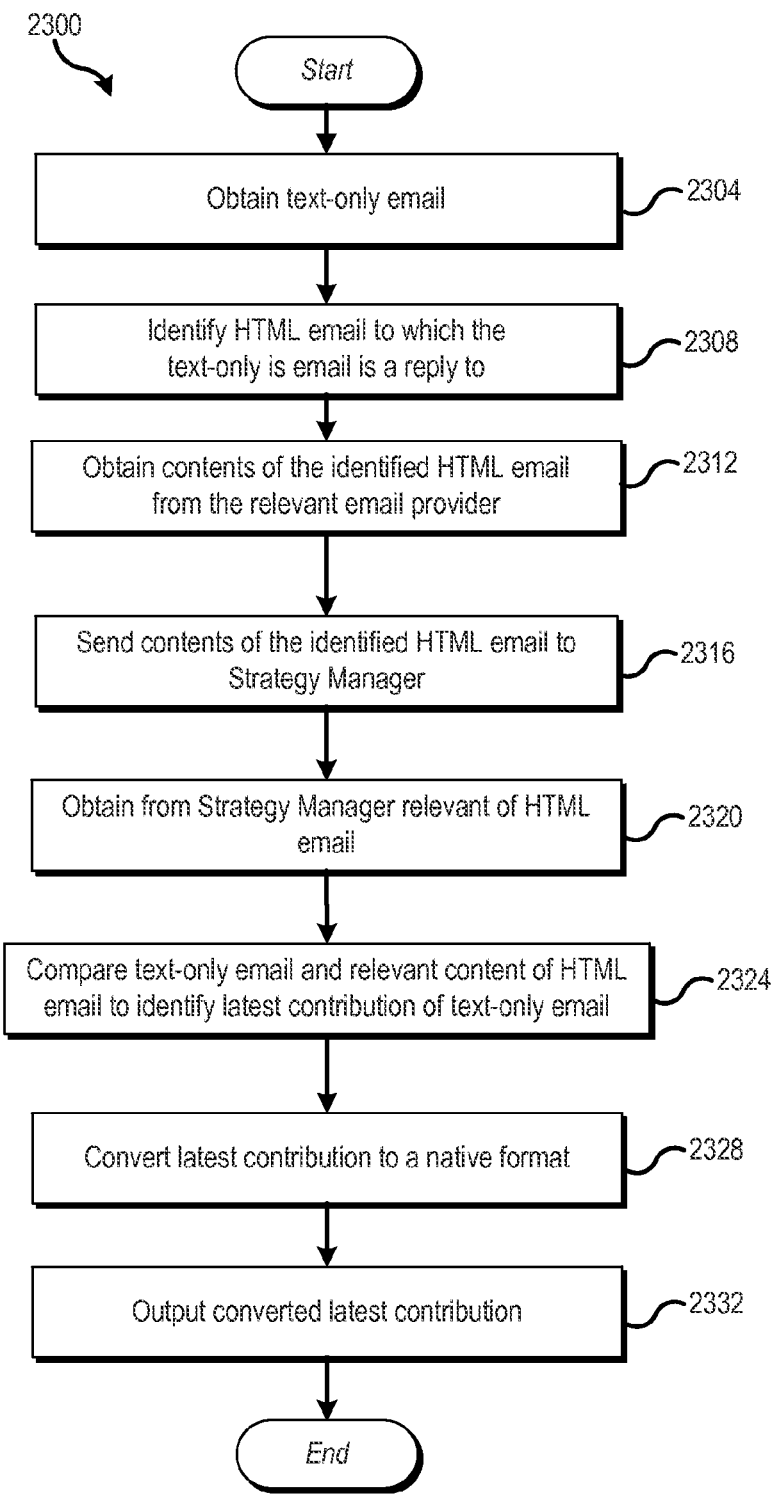
FIG. 23 shows a flow diagram of a process of identifying relevant content in a text-only email, and converting the relevant content to a native format, in accordance with embodiments of the present invention.

FIG. 23 shows a flow diagram of process 2300 of identifying relevant content in a text-only email, and converting the relevant content to a native format, in accordance with embodiments of the present invention. Process 2300 generally begins at block 2304, where process 2300 obtains a text-only email. For example, one of service modules 420 can receive a text-only email from one of message providers 108. In some embodiments, the text-only email can be a reply to an HTML email. In such embodiments, as indicated at block 2308, process 2300 can identify an HTML email to which the text-only email is a reply. For example, process 2300 can identify an HTML email based at least in part on one or more of an email address of a sender of the HTML email, a datestamp, a message identifier, a thread identifier, etc. At block 2312, process 2300 can obtain contents of the identified HTML email from a respective one of message providers 108. For example, process 2300 can determine, based at least in part on the previously obtained identifying information, a particular one of message providers 108 that was used to send the HTML email, and process 2300 can send some or all of that identifying information to the particular one of message providers 108, along with a request that the message provider reply with the contents of that HTML email.

At block 2316, process 2300 can send the contents of the HTML email to strategy manager 508. For example, process 2300 can send the contents of the HTML email to strategy manager 508 and request that strategy manager select and apply one of strategies 524 or 528 to identify relevant content in the HTML email. Strategy manager 508 can do so, according to embodiments described herein with reference to FIGS. 1-22. At block 2320, process 2300 can obtain relevant content of HTML email from strategy manager 508. At block 2324, process 2300 can compare text-only email and relevant content of HTML email to identify latest contribution of text-only email. For example, process 2300 can perform a div comparison to identify differences in the text-only email and the relevant content identified in the previous HTML email, and such differences can be a latest contribution of the text-only email. At block 2328, process 2300 can convert the latest contribution to a native format. For example, native converter 516 can convert latest contribution to a native format according to embodiments described herein with reference to FIGS. 20-22. At block 2332, process 2300 can output the converted latest contribution. For example, native converter 516 can provide the converted latest contribution to mailbox service layer 408, which can make available the converted latest contribution to an email app of client device 100 for display to a user.

Figure 24:
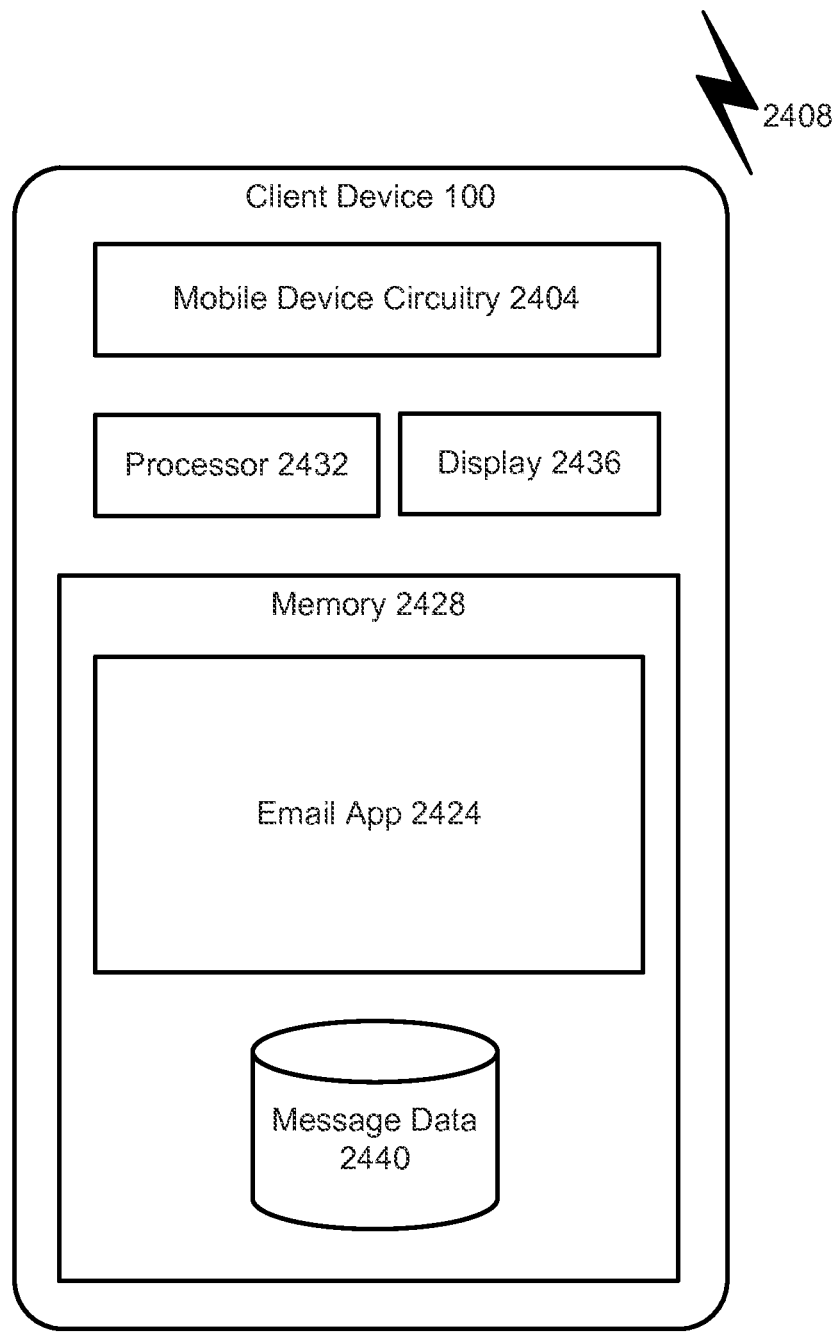
FIG. 24 shows a functional block diagram of the primary components of the client device of FIG. 1 in accordance with embodiments of the present invention.

FIG. 24 shows a functional block diagram of the primary components of client device 100 of FIG. 1 in accordance with embodiments of the present invention. In some embodiments, client device 100 can be a mobile telephone, although, as noted, implementation of embodiments of the present invention is not limited to this illustrated embodiment, and client device 100 can take any suitable form. For example, client device 100 can be a PDA, tablet computer, laptop computer, desktop computer, a wearable computer, a pager, etc. Client device 100 can include wireless communication circuitry 2404 that enables certain telephony functions. For example, network 104 of FIG. 1 can be a mobile or cellular network, and wireless communication circuitry 2404 can enable client device 100 to access the mobile or cellular network via wireless communications capabilities 2408. Also, for example, network 104 can be the Internet and wireless communication circuitry 2404 and can enable client device 100 to access the Internet via wireless communications capabilities 2408. For example, wireless communications capabilities 2408 can be a WiFi network that connects client device 100 to the Internet.

Client device 100 can include email app 2424, which can be implemented in the form of one or more of software, firmware, or hardware. In some embodiments, email app 2424 can manage the sending, receiving, and manipulation of email messages. Email app 2424 can be capable of communicating directly with message providers 108 and message management service 112, which, in some embodiments, is a proxy for message providers 108 that provide email services. In some embodiments, email app 2424 can render to a user via display 2436 an email or conversation received from one of message providers 108 or message management system. For example, email app 2424 can render to a user latest email 116 and corresponding conversation illustrated in FIGS. 1-3 and 6. It should also be appreciated that email app 2424 can be configured to provide some or all of the services provided by message management service 112, including identifying relevant content in an email and converting identified relevant content to a native format as described herein with reference to FIGS. 1-23.

Client device 100 can include message data 2440. In some embodiments, message data 2440 can include emails and conversations that a user has saved in his local inbox and/or other local email folders. For example, a user's local inbox and/or other local email folder can be "replicated" in message data 416 of message management service 112. In this case, a user can access his inbox and other email folders across devices. In some embodiments, message data can be emails and conversation received at client device 100 from message management service 112.

Email app 2424 can exchange data with mobile device circuitry 2404. In one example, email app 2424 can send an outgoing email or conversation to mobile device circuitry 2404 for transmission to message management service 112. Similarly, mobile device circuitry 2404 can receive an email or conversation from message management service 112 and send that email or conversation to email app 2424. In some embodiments, email app 2424 is stored as executable instructions in memory 2428. In these embodiments, processor 2432 can access memory 2428 to load and unload the executable instructions and data as needed to execute the instructions to perform the functions of the apps.

Figure 25:
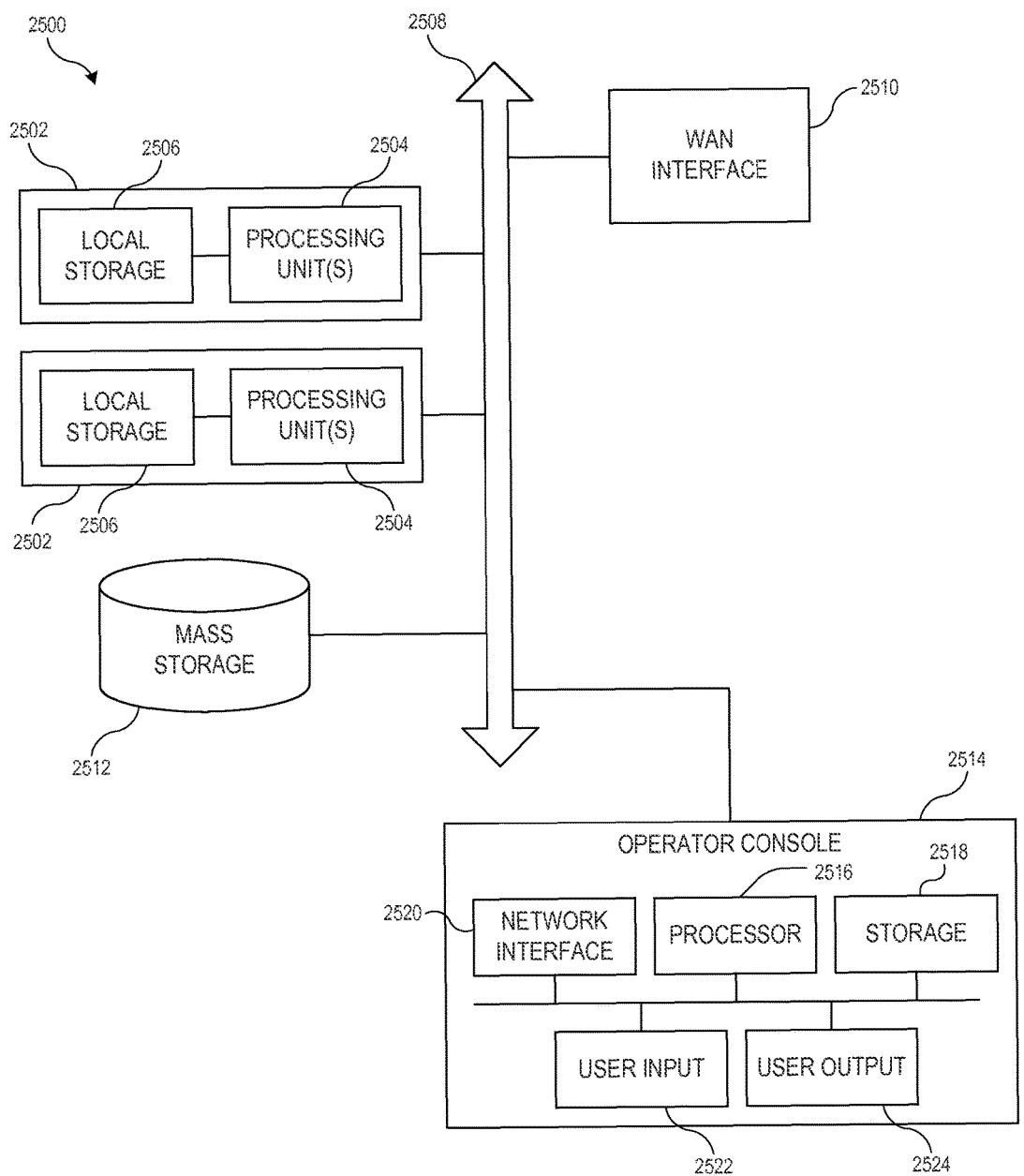
FIG. 25 is a simplified block diagram illustrating a representative server system in accordance with embodiments of the present invention.

Various operations described herein can be implemented on server systems, which can be of generally conventional design. FIG. 25 is a simplified block diagram illustrating a representative server system 2500 in accordance with embodiments of the present invention. In various embodiments, server system 2500 or similar systems can implement backend server infrastructure 402, message service 404, mailbox service 408, transfer layers 412a-b, service modules 420, metadata analyzer 504, strategy manager 508, native converter 516b, strategies 524, fallback strategy 528, text-based strategies 523, message providers 108, message management service 112, or any other services or servers described herein or portions thereof. In various embodiments, server system 2500 or similar systems can enable execution of some or all aspects of processes 700, 800, 900, 1000, 1900, 2000, 2300 or similar processes.

Server system 2500 can have a modular design that incorporates a number of modules 2502 (e.g., blades in a blade server implementation); while two modules 2502 are shown, any number can be provided. Each module 2502 can include processing unit(s) 2504 and local storage 2506.

Processing unit(s) 2504 can include a single processor, which can have one or more cores, or multiple processors. In some embodiments, processing unit(s) 2504 can include a general-purpose primary processor as well as one or more special-purpose co-processors such as graphics processors, digital signal processors, or the like. In some embodiments, some or all processing units 2504 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 2504 can execute instructions stored in local storage 2506. Any type of processors in any combination can be included in processing unit(s) 2504.

Local storage 2506 can include volatile storage media (e.g., conventional DRAM, SRAM, SDRAM, or the like) and/or non-volatile storage media (e.g., magnetic or optical disk, flash memory, or the like). Storage media incorporated in local storage 2506 can be fixed, removable or upgradeable as desired. Local storage 2506 can be physically or logically divided into various subunits such as a system memory, a read-only memory (ROM), and a permanent storage device. The system memory can be a read-and-write memory device or a volatile read-and-write memory, such as dynamic random access memory. The system memory can store some or all of the instructions and data that processing unit(s) 2504 need at runtime. The ROM can store static data and instructions that are needed by processing unit(s) 2506. The permanent storage device can be a read-and-write memory device. This permanent storage device can be a non-volatile memory unit that stores instructions and data even when module 2502 is powered down. The term "storage media" as used herein includes any medium in which data can be stored indefinitely (subject to overwriting, electrical disturbance, power loss, or the like) and does not include carrier waves and transitory electronic signals passing wirelessly or over wired connections.

In some embodiments, local storage 2506 can store one or more software programs to be executed by processing unit(s) 2504, such as an operating system and/or programs implementing various server functions such as functions of implemented backend server infrastructure 402, message service 404, mailbox service 408, transfer layers 412a-b, service modules 420, metadata analyzer 504, strategy manager 508, native converter 516b strategies 524, fallback strategy 528, text-based strategies 523, or any other services or servers described herein or portions thereof, or any other service(s) or server(s) associated with message management service 112 of FIG. 1. In some embodiments, local storage 2506 can store one or more software programs to be executed by processing unit(s) 2504, such as an operating system and/or programs implementing various server functions such as some or all aspects of processes 700, 1400, 1500, 1900, 200, 2300, or similar processes. "Software" refers generally to sequences of instructions that, when executed by processing unit(s) 2504 cause server system 2500 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 2504. Software can be implemented as a single program or a collection of separate programs or program modules that interact as desired. From local storage 2506 (or non-local storage described below), processing unit(s) 2504 can retrieve program instructions to execute and data to process in order to execute various operations described herein.

In some server systems 2500, multiple modules 2502 can be interconnected via a bus 2508, forming a local area network that supports communication between modules 2502 and other components of server system 2500. Bus 2508 can be implemented using various technologies including server racks, hubs, routers, etc.

A wide area network (WAN) interface 2510 can provide data communication capability between the local area network (bus 2508) and a larger network, such as the Internet. Conventional or other communications technologies can be used, including wired (e.g., Ethernet, IEEE 802.3 standards) and/or wireless technologies (e.g., Wi-Fi, IEEE 802.11 standards).

In some embodiments, local storage 2506 is intended to provide working memory for processing unit(s) 2504, providing fast access to programs and/or data to be processed while reducing traffic on bus 2508. Storage for larger quantities of data can be provided on the local area network by one or more mass storage subsystems 2512 that can be connected to bus 2508. Mass storage subsystem 2512 can be based on magnetic, optical, semiconductor, or other data storage technologies. Direct attached storage, storage area networks, network-attached storage, and the like can be used. Any data stores or other collections of data described herein as being produced or consumed by servers can be stored in mass storage subsystem 2512. In some embodiments, additional data storage resources may be accessible via WAN interface 2510 (potentially with somewhat increased latency).

Server system 2500 can operate in response to requests received via WAN interface 2510. For example, one of modules 2502 can implement a supervisory function and assign discrete tasks to other modules 2502 in response to received requests. Conventional work allocation techniques can be used. As requests are processed, results can be returned to the requester via WAN interface 2510. Such operation can generally be automated. Further, in some embodiments, WAN interface 2510 can connect multiple server systems 2500 to each other, providing scalable solutions capable of managing high volumes of activity. Conventional or other techniques for managing server systems and server farms (collections of server systems that cooperate) can be used, including dynamic resource allocation and reallocation.

In some embodiments, operator console 2514 can be provided to allow a system operator or administrator to interact directly with server system 2500, e.g., for purposes of monitoring, testing, troubleshooting, upgrading, or the like. Operator console 2514 can include conventional computer components such as a processor 2516, storage device 2518, network interface 2520, user input device 2522, and user output device 2524. In some embodiments, operator console 2514 can be physically remote from the rest of server system 2500 and can be connected via WAN interface 2510.

Processor 2516 and storage device 2518 can be similar to processing unit(s) 2504 and local storage 2506 described above. Suitable devices can be selected based on the demands to be placed on operator console 2514; for example, console 2514 can be implemented as a "thin" client with limited processing capability. Network interface 2520 can provide a connection to bus 2508. User input device 2522 can include any device (or devices) via which a user can provide signals to console 2514; console 2514 can interpret the signals as indicative of particular user requests or information. In various embodiments, user input device 2522 can include any or all of a keyboard, touch pad, touch screen, mouse or other pointing device, scroll wheel, click wheel, dial, button, switch, keypad, microphone, and so on.

User output device 2524 can include any device via which console 2514 can provide information to a user. For example, user output device 2524 can include a display to display images generated by or delivered to console 2514. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 2524 can be provided in addition to or instead of a display. Examples include indicator lights, speakers, tactile "display" devices, printers, and so on.

Some embodiments include electronic components, such as microprocessors, storage and memory that store computer program instructions in a computer-readable storage medium. Many of the features described in this specification can be implemented as processes that are specified as a set of program instructions encoded on a computer-readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 2504 can provide various functionality for server system 2500, including any of the functionality described herein as being performed by a server or other functionality associated with an online content management service.

As noted above with reference to FIG. 1, message management service 112 and message providers 108 can interact with various client devices (e.g., client device 100) via a network (e.g., network 104) such as the Internet. Such client devices can be computing devices with network connectivity provided using wired and/or wireless technologies (e.g., devices such as device 2400 at FIG. 24). Such devices can be provisioned with program code to enable various interactions with message management service 112 such as accessing stored content items, receiving push notifications, retrieving and displaying interface screens (e.g., web pages). In some embodiments, such devices can be provisioned with program code to enable some or all aspects of processes 700, 800, 900, 1000, 1900, 2000, 2300.

It will be appreciated that server system 2500 is illustrative and that variations and modifications are possible. Server system 2500 can have other capabilities not specifically described here. Further, while server system 2500 is described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

While the invention has been described with respect to specific embodiments, one skilled in the art will recognize that numerous modifications are possible. For example, the particular events, data structures, servers, clients, and notification channels described herein are used for purposes of illustration; other events, data structures, servers, clients, and notification channels can be substituted.

Embodiments described above can make reference to data structures and databases or data stores. It is to be understood that these terms can encompass any techniques for organizing information into discrete records that can be stored, retrieved and interpreted by computer systems.

The various processes described herein illustrative, and it should be understood this description can encompass variations of these disclosed processes. For example, the description can encompass processes having additional steps, processes having less steps, processes having steps executed in a different order, etc. Further, processes as described herein can be implemented on any or all of server systems and user's devices (including server systems and devices that implement different operating platforms).

Further, all of the interfaces described above and shown in the drawings are illustrative and can be modified as desired. The interfaces can be graphical user interfaces that show example screenshots of emails and conversations. It should be appreciated that the illustrated emails and conversations, such as those shown in FIGS. 1-3 and 6, are exemplary and that one of ordinary skill in the art will recognize that these emails and conversations can be formatted and displayed in a number of differing designs. The interfaces can be graphical user interfaces, with on-screen control elements that the user can operate, e.g., using a pointing device or touchscreen to select and activate the control elements. Other types of interfaces can also be used, including interfaces using soft keys, keystrokes, gestures, or the like. In addition, while visual interfaces are shown, it is to be understood that interfaces can also incorporate other sensory modalities, and an interface can have audio elements (e.g., voice command inputs and/or synthesized speech outputs), tactile and/or haptic elements, and so on, in addition to or instead of visual elements.

Embodiments of the present invention can be realized using any combination of dedicated components and/or programmable processors and/or other programmable devices. The various processes described herein can be implemented on the same processor or different processors in any combination, including processor 2432 of client device 100, as well as processors of mailbox service layer 408 and message service layer 404 of message management system 112, as well as servers and processors associated with service modules 420, metadata analyzer 504, strategy manager 508, native converter 516, strategies 524, fallback strategy 528, and text-based strategies 532. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded and stored on various computer-readable storage media; such as memory 2428 of client device 100, as well as memory of several computers that implement/host mailbox service layer 408, message service layer 404, message management system 112, service modules 420, metadata analyzer 504, strategy manager 508, native converter 516, strategies 524, fallback strategy 528, and text based strategies 532; suitable media include magnetic disk or tape, optical storage media such as compact disk (CD) or DVD (digital versatile disk), flash memory, and other non-transitory media. Computer readable storage medium encoded with the program code can be packaged with a compatible electronic device, or the program code can be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
   processing, using a plurality of strategy modules implemented on a server system, an email to identify relevant content included in the email, where the plurality of strategy modules include a first strategy module for identifying relevant content in emails from a first message provider and a second strategy module for identifying relevant content in emails from a second message provider;
   generating, by the first strategy module, a first identified relevant content and a first corresponding confidence score, where the first confidence score is based on a first pattern that corresponds to a first type of message boundary that separates a reply email from a previous email in a thread;
   generating, by the second strategy module, a second identified relevant content and a second corresponding confidence score, where the second confidence score is based on a second pattern that corresponds to a second type of message boundary that separates the reply email from the previous email in the thread;

comparing, by a strategy manager, the first corresponding confidence score and the second corresponding confidence score;

selecting, by the strategy manager, the first identified relevant content as a selected identified relevant content when the first corresponding confidence score is greater than the second corresponding confidence score based on the comparison, where each confidence score is based on how closely the pattern detected in the email matches the message boundary pattern that the plurality of strategy modules can be configured to detect; and displaying the selected identified relevant content that has the highest corresponding confidence score.

2. The method of claim 1, wherein the email is a latest email in a thread and includes contents of a previous email.

3. The method of claim 2, wherein, for each of the strategy modules, processing the email further includes:

detecting in the latest email a pattern that closely matches a message boundary pattern, the message boundary pattern indicating a message boundary in the latest email, the message boundary separating contents of the latest email and the contents the previous email in the thread; and identifying a latest contribution in the contents of the latest email, the latest contribution being relevant content in the contents of the latest email.

4. The method of claim 3, wherein, for each of the strategy modules, processing the email further includes:

constructing a tree structure having a plurality of nodes that correspond to the latest email and the previous email; and placing the relevant contents of the previous email and the latest email into the corresponding nodes of the tree structure.

5. The method of claim 1, further comprising:

obtaining, by a native converter implemented on a computer, the relevant content selected by the strategy manager; and converting, by the native converter, the relevant content selected by the strategy manager to a native format.

6. The method of claim 5, wherein the native converter converts the relevant content selected by the strategy manager to the native format by:

identifying a base node from among the nodes of the tree structure; converting the relevant content of the base node to the native format; recursively walking to a next node of the nodes of the tree structure; and converting the relevant content of the next node to the native format.

7. The method of claim 6, wherein the native converter is configured to continue walking the tree structure until the relevant content has been converted to the native format.

8. The method of claim 5, wherein the native format is a flat string with a plurality of stylings.

9. The method of claim 5, wherein the native converter converts the relevant content selected by the strategy manager from a HTML DOM (Document Object Model) to a flat string with a plurality of stylings.

10. A server system comprising:

a strategy manager server having a processor and a memory;

a plurality of strategy modules stored in the memory of the strategy manager server, where the plurality of strategy modules include a first strategy module for identifying relevant content in emails from a first message provider based on an email format used by the first message provider and a second strategy module for identifying relevant content in emails from a second message provider based on an email format used by the second message provider, each of the strategy modules being configured to:

detect in a latest email a pattern that closely matches a message-boundary pattern, the message-boundary pattern indicating a message boundary in the latest email, the message boundary separating contents of the latest email and the contents the previous email in the thread;

identify a latest contribution in the contents of the latest email, the latest contribution being relevant content in the contents of the latest email; and determine a confidence score indicative of how closely the pattern detected in the latest email matches the message-boundary pattern; the strategy manager server being configured to:

apply two or more of the strategy modules to the latest email; compare two or more confidence scores; and select from among two or more latest contributions identified by the strategy modules a latest contribution associated with a highest confidence score based on the comparison.

11. The server system of claim 10, wherein the latest contribution is part of a conversation between a sender of the previous email and the sender of the latest email.

12. The server system of claim 11, wherein each of the strategy modules include program code to:

construct a tree structure having first and second nodes that correspond to the previous email and the latest email;

place relevant content of the previous email in the first node of the tree structure; and place the relevant content of the latest email in the second node of the tree structure.

13. The server system of claim 12, further comprising:

a native converter server having a processor and a memory, the native converter being configured to:

identify a base node from among the first and second nodes of the tree structure;

convert the relevant content of the base node to the native format; recursively walk to a next node of the tree structure; and convert the relevant content of the next node to the native format.

14. The method of claim 13, wherein the native format is a flat string with a plurality of stylings.

15. A method comprising:

applying, by a server system, to an email a plurality of strategy modules, where the plurality of strategy modules include a first strategy module for identifying relevant content in emails from a first message provider based on an email format used by the first message provider and a second strategy module for identifying relevant content in emails from a second message provider based on an email format used by the second message provider;

each of the strategy modules being configured to:

detect in the email a pattern that closely matches a message-boundary pattern, the message-boundary pattern being indicative of a message boundary that separates a latest email from a previous email in the thread;

identify relevant content of latest email as the latest contribution; and determine a confidence score indicative of how closely the pattern detected in the email matches the message-boundary pattern; and comparing two or more confidence scores;

selecting, by the server system, from among one or more of latest contributions identified by two or more of the strategy modules a latest contribution associated with a highest confidence score based on the comparison.

16. The method of claim 15, wherein the strategy modules are further configured to construct a conversation by:

constructing a tree structure having a plurality of nodes that correspond to the previous email and latest email; and placing relevant contents of the previous email and the selected latest contribution of the latest email in the corresponding nodes of the tree structure.

17. The method of claim 16, further including:

converting, by the server system, the relevant contents of the previous email and the selected latest contribution of the latest email.

18. The method of claim 17, wherein the native format is a flat string with a plurality of stylings.

19. A non-transitory computer-readable storage medium having stored thereon executable instructions that, when executed by one or more processors of a computer system, cause the computer system to execute a method comprising:

applying to an email a plurality of strategy modules, where the plurality of strategy modules include a first strategy module for identifying relevant content in emails from a first message provider based on an email format used by the first message provider and a second strategy module for identifying relevant content in emails from a second message provider based on an email format used by the second message provider, each of the strategy modules being configured to:

detect in the email a pattern that closely matches a message-boundary pattern, the message-boundary pattern being indicative of a message boundary that separates a latest email from a previous email;

identify relevant content of the latest email as a latest contribution in the email; and determine a confidence score for the latest contribution, the confidence score being indicative of how closely the pattern detected in the email matches the message-boundary pattern; and compare two or more confidence scores;

selecting from among one or more of latest contributions identified by two or more of the strategy modules a latest contribution having a highest confidence score based on the comparison.

20. The computer-readable storage medium of claim 19, wherein the strategy modules are further configured to construct a conversation by:

constructing a tree structure having a plurality of nodes that correspond to the previous email and the latest email; and placing relevant content of the previous email and latest email into the corresponding nodes of the tree structure.

21. The computer-readable storage medium of claim 19, wherein the method further includes:

obtaining the latest contribution selected by the strategy manager; and converting the latest contribution to a native format.

22. The computer-readable storage medium of claim 21, wherein the native format is a flat string with a plurality of stylings.

23. A server system, comprising:

a strategy manager server having a processor and a memory;

a plurality of strategy modules stored in the memory of the strategy manager server, where the plurality of strategy modules include a first strategy module for identifying relevant content in emails from a first message provider based on an email format used by the first message provider and a second strategy module for identifying relevant content in emails from a second message provider based on an email format used by the second message provider, the strategy modules configured to:

detect in an email a format that closely matches at least one of a latest reply or a latest forward;

detect in the email a pattern that closely matches a message-boundary pattern, the message-boundary pattern being indicative of a message boundary that separates at least one of a latest reply or a latest forward from a previous email;

identify relevant content of one of the latest reply or the latest forward as a latest contribution of the email; and determine a confidence score for the latest contribution, the confidence score being indicative of how closely the pattern detected in the email matches the message-boundary pattern;

the strategy manager server being configured to:

apply some or all of the strategy modules to an email; compare two or more confidence scores; and select from among one or more latest contributions identified by some or all of the strategy modules a latest contribution having a highest confidence score based on the comparison.

24. The server system of claim 23, wherein the strategy modules are further configured to construct a conversation by:

constructing a tree structure having a plurality of nodes that corresponds to a previous email and at least one of a latest reply or a latest forward; and placing relevant content of the previous email and the latest contribution of one of the latest reply or latest forward into the corresponding nodes of the tree structure.

25. The server system of claim 23, further including: a native converter server having a processor and a memory, the native converter being configured to convert the latest contribution selected by the strategy manager to a native format.

* * * * *